(12) United States Patent
Cyr et al.

(10) Patent No.: US 6,620,858 B2
(45) Date of Patent: Sep. 16, 2003

(54) COLORANTS CONTAINING COPOLYMERIZABLE VINYL GROUPS AND SULFONAMIDE LINKAGES

(75) Inventors: Michael John Cyr, Kingsport, TN (US); Max Allen Weaver, Kingsport, TN (US); Gerry Foust Rhodes, Piney Flats, TN (US); Jason Clay Pearson, Kingsport, TN (US); Phillip Michael Cook, Kingsport, TN (US); Jos Simon De Wit, Kingsport, TN (US); Larry Keith Johnson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 2 days.

(21) Appl. No.: 09/920,151

(22) Filed: Aug. 1, 2001

(65) Prior Publication Data

US 2002/0128343 A1 Sep. 12, 2002

Related U.S. Application Data

(60) Provisional application No. 60/223,520, filed on Aug. 7, 2000.

(51) Int. Cl.[7] .................... C08F 2/46; C08F 220/10; C07C 311/00; C07C 303/36; C07C 309/63; C09B 62/00

(52) U.S. Cl. .................... 522/96; 522/103; 522/107; 522/167; 522/173; 564/80; 564/82; 564/84; 564/88; 564/95; 564/98; 564/99; 526/328; 526/328.5; 552/234; 552/236; 552/208

(58) Field of Search .................. 522/173, 180, 522/182, 48, 57, 7, 14, 17, 27, 103, 107, 96, 167; 564/80–100; 526/328, 328.5; 552/208, 234, 236

(56) References Cited

U.S. PATENT DOCUMENTS

| 3,364,186 A | | 1/1968 | Wilhelm et al. |
|---|---|---|---|
| 4,115,056 A | | 9/1978 | Koller et al. |
| 4,169,203 A | * | 9/1979 | Wingard et al. ............... 546/76 |
| 4,381,158 A | * | 4/1983 | Swanson et al. ............... 8/506 |
| 4,403,092 A | | 9/1983 | Davis et al. |
| 4,763,371 A | | 8/1988 | Parton |
| 4,943,617 A | | 7/1990 | Etzbach et al. |
| 5,055,602 A | | 10/1991 | Melpolder |
| 5,102,980 A | | 4/1992 | Krutak et al. |
| 5,109,097 A | | 4/1992 | Klun et al. |
| 5,188,641 A | | 2/1993 | Parton |
| 5,362,812 A | * | 11/1994 | Holmes et al. |
| 5,367,039 A | | 11/1994 | Yabuuchi et al. |
| 5,372,864 A | | 12/1994 | Weaver et al. |
| 5,453,482 A | | 9/1995 | Weaver et al. |
| 5,578,419 A | * | 11/1996 | Itoh et al. ................. 430/281.1 |
| 5,637,637 A | * | 6/1997 | Sharma et al. .............. 524/502 |
| 5,900,445 A | | 5/1999 | Chandler et al. |
| 6,022,944 A | | 2/2000 | Weaver et al. |
| 6,121,351 A | | 9/2000 | Weaver et al. |
| 2002/0069725 A1 | * | 6/2002 | Cyr et al. |
| 2002/0132874 A1 | * | 9/2002 | Cyr et al. |

FOREIGN PATENT DOCUMENTS

| EP | 0 322 808 | 7/1989 |
|---|---|---|
| GB | 1046751 | 10/1966 |
| GB | 1235289 | 6/1971 |
| WO | WO 96/01283 | 1/1996 |
| WO | WO 97/48744 | 12/1997 |
| WO | WO 98/23690 | 6/1998 |

OTHER PUBLICATIONS

Chemistry and Technology of UV and EB Formulation for Coatings, Inks and Paints, vol. II: Prepolymers and Reactive Diluents, G. Webster, John Wiley & Sons, London, 1997.
Asquith et al, "Self–Coloured Polymers Based on Anthraquinone Residues", Journal of the Society of Dyers and Colourists, vol. 93, No. 4, Apr., 1977, pp. 114–125.

* cited by examiner

*Primary Examiner*—Susan W. Berman
(74) *Attorney, Agent, or Firm*—Michael J. Blake; Bernard J. Graves, Jr.

(57) ABSTRACT

Disclosed are thermally-stable, colored, photopolymerizable compounds containing a vinyl group which are capable of being copolymerized with reactive vinyl monomers to produce colored compositions such as polyacrylates, polymethacrylates, polystyrene, etc. The compounds exhibit good thermal stability, fastness (stability) to UV-light, good solubility in the reactive monomers and good color strength.

28 Claims, No Drawings

COLORANTS CONTAINING COPOLYMERIZABLE VINYL GROUPS AND SULFONAMIDE LINKAGES

CROSS REFERENCE TO RELATED APPLICATION

This application claims the benefit of U.S. Provisional Application Ser. No. 60/223,520 filed Aug. 7, 2000.

FIELD OF THE INVENTION

This invention pertains to thermally-stable, colored, photopolymerizable compounds containing a vinyl group which are capable of being copolymerized with reactive vinyl monomers to produce colored compositions such as polyacrylates, polymethacrylates, polystyrene, etc. The compounds exhibit good thermal stability, fastness (stability) to UV-light, good solubility in the reactive monomers and good color strength.

BACKGROUND AND PRIOR ART

It is known (J.S.D.C., Apr. 1977, pp 114–125) to produce colored polymeric materials by combining a reactive polymer such terepolymers having epoxy groups or polyacryloyl chloride with anthraquinone dyes containing nucleophilic reactive groups such as amino or hydroxy groups; to graft acryloylaminoanthraquinone dyes to the backbone of vinyl or divinyl polymers; and to polymerize anthraquinone dyes containing certain olefinic groups to produce polymeric dyes/pigments. U.S. Pat. No. 4,115,056 describes the preparation of blue, substituted 1,4-diaminoanthraquinone dyes containing one acryloyloxy group and and the use of the dyes in coloring various fibers, especially polyamide fibers. U.S. Pat. No. 4,943,617 discloses liquid crystalline copolymers containing certain blue, substituted 1,5-diamino-4,8-dihydroxyanthraquinone dyes containing an olefinic group copolymerized therein to provide liquid crystal copolymers having high dichromism. U.S. Pat. No. 5,055,602 describes the preparation of certain substituted 1,4-diaminoanthraquinone dyes containing polymerizable acryloyl and methacryloyl groups and their use in coloring polyacrylate contact lens materials by copolymerizing.

U.S. Pat. No. 5,362,812 discloses the conversion of a variety of dye classes, including anthraquinones, into polymeric dyes by (a) polymerizing 2-alkenylazlactones and reacting the polymer with dyes containing nucleophilic groups and by (b) reacting a nucleophilic dye with an alkenylazlactone and then polymerizing the free radically polymerizable dyes thus produced. The polymeric dyes are reported to be useful for photoresist systems and for color-proofing. U.S. Pat. No. 5,367,039 discloses a process for preparing colored vinyl polymers suitable for inks, paints, toners and the like by emulsion polymerization of a vinyl monomer with reactive anthraquinone dyes prepared by functionalizing certain anthraquinone dyes with methacryloyl groups.

The preparation of a variety of dyes, including some anthraquinones, which contain photopolymerizable groups and their use for color filters suitable for use in liquid crystal television sets, color copying machines, photosensitive resist resin compositions, and the like are described in U.S. Pat. No. 5,578,419.

BRIEF SUMMARY OF THE INVENTION

One embodiment of the present invention concerns thermally-stable, photopolymerizable dye or colorant compounds having having Formula I:

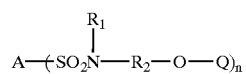

I wherein
A is a mono-, di-, tri- or tetravalent chromophore;
$R_1$ is selected from hydrogen, $C_1$–$C_6$ alkyl, substituted $C_1$–$C_6$ alkyl, $C_3$–$C_8$ cycloalkyl, aryl and —$R_2$—OQ;
$R_2$ is selected from $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene and —(—$CH_2CH_2O$)$_m$—$CH_2CH_2$—;
m is 1–3;
n is 1–4;
Q is an ethylenically-unsaturated, photopolymerizable group selected from the following organic radicals:

Ia

IIa

IIIa

IVa

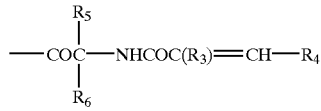

Va

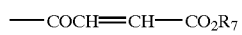

VIa

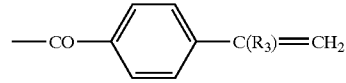

VIIa

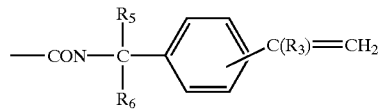

VIIIa

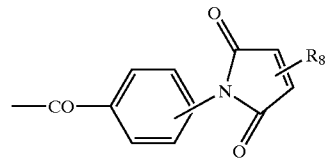

IXa

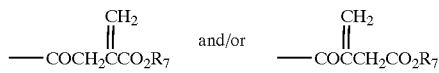

wherein
$R_3$ is selected from hydrogen or $C_1$–$C_6$ alkyl;
$R_4$ is selected from hydrogen, $C_1$–$C_6$ alkyl; phenyl; phenyl substituted with one or more groups selected from $C_1$–$C_6$ alkyl, $C_1$–$C_6$ alkoxy, —N($C_1$–$C_6$ alkyl)$_2$, nitro, cyano, $C_2$–$C_6$ alkoxycarbonyl, $C_2$–$C_6$ alkanoyloxy and halogen; 1- and 2-naphthyl; 1- and 2-naphthyl substituted with $C_1$–$C_6$ alkyl and $C_1$–$C_6$ alkoxy; 2- and 3-thienyl; 2- and 3-thienyl substituted with $C_1$–$C_6$ alkyl or halogen; 2- and 3-furyl; 2- and 3-furyl substituted with $C_1$–$C_6$ alkyl;
$R_5$ and $R_6$ are independently selected from hydrogen, $C_1$–$C_6$ alkyl, substituted $C_1$–$C_6$ alkyl, aryl or may be combined to represent a —(—$CH_2$—)$_{3-5}$ radical;

$R_7$ is hydrogen or a group selected from $C_1$–$C_6$ alkyl, substituted $C_1$–$C_6$ alkyl, $C_3$–$C_8$ alkenyl, $C_3$–$C_8$ cycloalkyl and aryl;

$R_9$ is selected from hydrogen, $C_1$–$C_6$ alkyl and aryl.

A second embodiment of the present invention pertains to a coating composition comprising (i) one or more polymerizable vinyl compounds, (ii) one or more of the thermally-stable, photopolymerizable dye or colorant compounds of Formula I, and (iii) a photoinitiator. A third embodiment of the present invention pertains to a polymeric composition, typically a coating, comprising a polymer of one or more acrylic acid esters, one or more methacrylic acid esters and/or other polymerizable vinyl compounds, having copolymerized therein one or more of the dye compounds of Formula I.

DETAILED DESCRIPTION OF THE INVENTION

In formula I, A represents a mono-, di-, tri- or tetravalent residue of a chromophore, i.e., a colored compound. Examples of the chromophoric residues which A may represent include anthraquinone, anthrapyridone (3H-dibenz-[f, ij]-isoquinoline-2,7-dione), anthrapyrimidine (7H-benzo-[e]-perimidine-7-one), anthrapyridine (7H-dibenz-[f, ij]-isoquinoline-7-one), anthrapyrazole, anthraisothiazole, 14H-naptho[2,3-a]-phenothiazine-8,13-dione (phthaloylphenothiazine), phthalocyanine, metal phthalocyanine, methine, bis-methine, perinone, coumarin, quinophthalone, 3-aryl-2,5-dioxypyrroline, and 3-aryl-5-dicyanomethylene-2-oxypyrroline.

The terms "$C_1$–$C_6$-alkyl" and "$C_1$–$C_8$-alkyl" are used herein to denote a straight or branched chain saturated aliphatic hydrocarbon radical containing one to six or one to eight carbon atoms. The term "substituted $C_1$–$C_6$-alkyl" is used to denote a $C_1$–$C_6$-alkyl group substituted with one or more groups, preferably one to three groups, selected from the group consisting of hydroxy, halogen, cyano, aryl, aryloxy, arylthio, $C_1$–$C_6$ alkylthio, $C_3$–$C_8$-cycloalkyl, $C_2$–$C_6$-alkanoyloxy and —(—$OR_9$—)$_p$—$R_{10}$ wherein $R_9$ is selected from the group consisting of $C_1$—$C_6$ alkylene, $C_1$–$C_6$-alkylene-arylene, cyclohexylene, arylene, $C_1$–$C_6$-alkylene-cyclohexylene and $C_1$–$C_6$-alkylene-cyclohexylene-$C_1$–$C_6$-alkylene; $R_{10}$ is selected from the group consisting of hydrogen, hydroxy, carboxy, $C_2$–$C_6$-alkanoyloxy, $C_2$–$C_6$-alkoxycarbonyl, aryl and $C_3$–$C_8$-cycloalkyl; and p is 1, 2, or 3.

The terms "$C_1$–$C_6$-alkylene", "$C_2$–$C_6$-alkylene" and "$C_2$–$C_8$ alkylene" are used to denote straight or branched chain divalent aliphatic hydrocarbon radicals containing one to six, two to six, and two to eight carbons, respectively, which optionally may be substituted with one to three groups selected from $C_1$–$C_6$-alkoxy, $C_2$–$C_6$-alkoxycarbonyl, $C_2$–$C_6$-alkanoyloxy, hydroxy, aryl and halogen. The term "$C_3$–$C_8$-alkenyl" is used to denote an aliphatic hydrocarbon radical containing at least one double bond. The term "$C_3$–$C_8$-alkynyl" is used to denote an aliphatic hydrocarbon radical containing at least one triple bond and three to eight carbon atoms. The term "$C_3$–$C_8$-cycloalkyl" is used to denote a saturated cyclic hydrocarbon radical having three to eight carbon optionally substituted with one to three $C_1$–$C_6$-alkyl group(s). The term "$C_3$–$C_8$-cycloalkylene" is used to denote a cyclic divalent hydrocarbon radical which contains three to eight carbon atoms, preferably five or six carbons.

The term "aryl" as used herein denotes phenyl and phenyl substituted with one to three substituents selected from $C_1$–$C_6$-alkyl, substituted $C_1$–$C_6$-alkyl, $C_1$–$C_6$-alkoxy, halogen, carboxy, cyano, $C_2$–$C_6$-alkanoyloxy, $C_1$–$C_6$-alkylthio, $C_1$–$C_6$-alkylsulfonyl, trifluoromethyl, hydroxy, optionally substituted sulfamoyl, $C_2$–$C_6$-alkoxycarbonyl, $C_2$–$C_6$-alkanoylamino and —O—$R_{11}$, S—$R_{11}$, —$SO_2$—$R_{11}$, —$NHSO_2R_{11}$ and —$NHCOR_{11}$, wherein $R_{11}$ is phenyl or phenyl substituted with one to three groups selected from $C_1$–$C_6$-alkyl, $C_1$–$C_6$-alkoxy and halogen. The term "arylene" as used herein denotes includes 1,2-, 1,3- and 1,4-phenylene and such divalent radicals substituted with one to three groups selected from $C_1$–$C_6$-alkyl, $C_1$–$C_6$-alkoxy and halogen. The term "aroyl" denotes a moiety having the formula —CO—$R_{11}$ wherein $R_{11}$ is defined above.

The term "halogen" is used to include fluorine, chlorine, bromine, and iodine. The term "optionally substituted sulfamoyl" is used to describe the group having the structure —$SO_2N(R_{12})R_{13}$, wherein $R_{12}$, and $R_{13}$ are independently selected from hydrogen, $C_1$–$C_6$-alkyl, substituted $C_1$–$C_6$-alkyl, $C_3$–$C_8$-alkenyl, $C_3$–$C_8$-cycloalkyl, aryl and heteroaryl. The terms "$C_1$–$C_6$-alkoxy", "$C_2$–$C_6$-alkoxycarbonyl", "$C_2$–$C_6$-alkanoyl", "$C_2$–$C_6$-alkanoyloxy" and "$C_2$–$C_6$-alkanoylamino" are used to denote radicals corresponding to the structures —$OR_{14}$, —$COR_{14}$, —$CO_2R_{14}$, —$OCOR_{14}$ and $NHCOR_{14}$, respectively, wherein $R_{14}$ is $C_1$–$C_6$-alkyl or substituted $C_1$–$C_6$-alkyl.

The term "heteroaryl" as used herein denotes a 5- or 6-membered aromatic ring containing one to three hetero atom selected from oxygen, sulfur and nitrogen. Examples of such heteroaryl groups are thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, pyridyl, pyrimidyl, benzoxazolyl, benothiazolyl, benzimidazolyl, indolyl and the like and these optionally substituted with one to three groups selected from $C_1$–$C_6$-alkyl, $C_1$–$C_6$-alkoxy, substituted $C_1$–$C_6$-alkyl, halogen, $C_1$–$C_6$-alkylthio, aryl, arylthio, aryloxy, $C_2$–$C_6$-alkoxycarbonyl and $C_2$–$C_6$-alkanoylamino.

The preferred anthraquinone dyes or colorants of the invention which correspond to Formula I have the following structures:

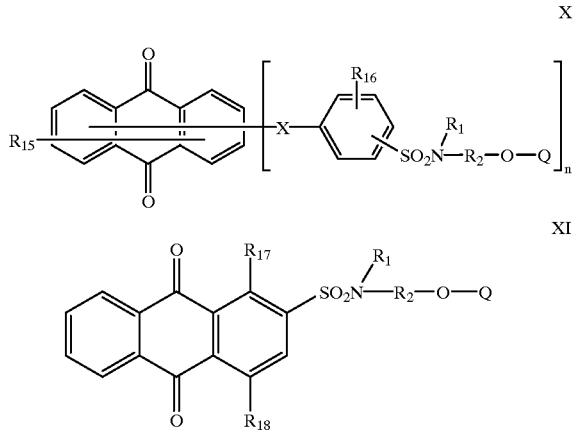

wherein $R_{15}$ is hydrogen or $R_{15}$ represents 1–4 groups selected from amino; $C_1$–$C_8$-alkylamino; $C_1$–$C_8$-alkylamino substituted with one or more groups selected from hydroxy, cyano, halogen, aryl, heteroaryl, $C_3$–$C_8$-cycloalkyl, furyl, $C_1$–$C_6$-alkoxy, $C_1$–$C_6$-alkylthio, arylthio, aryloxy and —$OCH_2CH_2O(OCH_2CH_2)_{1-3}OR'$, wherein R' is selected from hydrogen, $C_1$–$C_6$-alkyl and $C_2$–$C_6$-alkanoyloxy; $C_3$–$C_8$-cycloalkylamino; $C_3$–$C_8$-alkenylamino; $C_3$–$C_8$- alkynylamino; arylamino; furfurylamino; $C_1$–$C_6$-alkoxy; —OCH$_2$CH$_2$(OCH$_2$CH$_2$)$_{1-3}$OR', wherein R' is as previously defined; halogen; hydroxy; $C_1$–$C_6$-alkylthio; arylthio; aryl; aryloxy; arylsulfonyl; $C_2$–$C_6$-alkanoyl; aroyl; $C_2$–$C_6$-alkanoyloxy; $C_2$–$C_6$-alkoxycarbonyl; heteroaryl; heteroarylthio; cyano; nitro; trifluoromethyl; thiocyano; —SO$_2$C$_1$–C$_6$-alkyl; —SO$_2$NH$_2$; —SO$_2$NHC$_1$–C$_6$-alkyl; —SO$_2$N(C$_1$–C$_6$ alkyl)$_2$; —SO$_2$N(C$_1$–C$_6$ alkyl)aryl; —SO$_2$NH-aryl; —CONH$_2$; —CONHC$_1$–C$_6$-alkyl; —CON(C$_1$–C$_6$-alkyl)$_2$; —CONH-aryl; —CON(C$_1$–C$_6$alkyl) aryl; $C_1$–$C_6$ alkyl; tetrahydrofurfurylamino; —CH$_2$-cyclohexane-1,4-diyl-CH$_2$OR', wherein R' is as previously defined; or

$R_{16}$ is hydrogen or 1–2 groups selected from $C_1$–$C_6$-alkyl, $C_1$–$C_6$-alkoxy and halogen;

$R_{17}$ is selected from amino; $C_1$–$C_8$-alkylamino, substituted $C_1$–$C_8$-alkylamino is defined above, $C_3$–$C_8$-cycloalkylamino, $C_3$–$C_8$-alkenylamino, $C_3$–$C_8$-alkynylamino and arylamino;

$R_{18}$ is selected from halogen, amino, $C_1$–$C_8$ alkylamino, substituted $C_1$–$C_8$-alkylamino, $C_3$–$C_8$-cycloalkylamino, $C_3$–$C_8$-alkenylamino, $C_3$–$C_8$-alkynylamino, arylamino, hydroxy, arylthio, heteroarylthio, $C_2$–$C_6$-alkanoylamino, aroylamino, $C_1$–$C_6$-alkylsulfonylamino, and arylsulfonylamino;

X is a covalent bond or a linking group selected from —O—, —S—, —SO$_2$—, —NHCO—, —NHSO$_2$—, —NHCONH—, —OC$_2$–C$_6$ alkylene-, —OC$_2$–C$_6$-alkylene-O—, —S—C$_2$–C$_6$-alkylene-O— and, —O(CH$_2$CH$_2$O)$_{1-3}$—; and $R_1$, $R_2$, Q and n are as defined above for Formula I.

Preferred anthrapyridone (3H-dibenz[f, ij]-isoquinoline-2,7-diones) and anthrapyridine (7H-dibenz-[f, ij]-isoquinoline-7-ones) colorant compounds provided by the present invention have the following general formulas:

XII

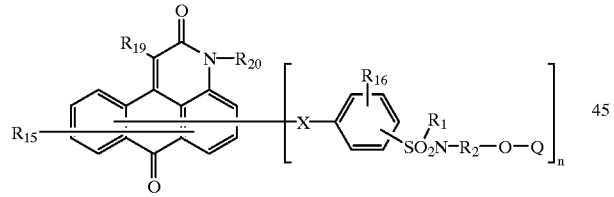

XIII

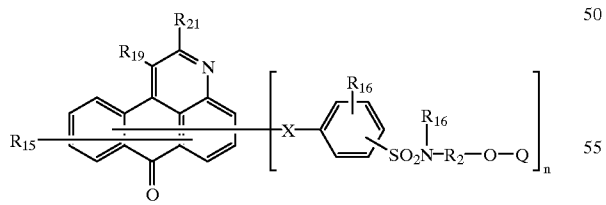

wherein:

$R_{19}$ is selected from hydrogen, cyano, $C_1$–$C_6$-alkoxy, $C_1$–$C_6$-alkylthio, aryl, arylamino, aryloxy, arylthio, heteroaryl, heteroarylthio, halogen, $C_2$–$C_6$-alkoxycarbonyl, aroyl, $C_1$–$C_6$-alkylsulfonyl, arylsulfonyl and $C_1$–$C_6$-alkylamino;

$R_{20}$ is selected from hydrogen, $C_1$–$C_8$-alkyl, substituted $C_1$–$C_8$-alkyl as defined above, aryl and $C_3$–$C_8$-cyloalkyl;

$R_2$, is selected from hydrogen, $C_1$–$C_6$-alkyl, aryl and —N(R$_{22}$)R$_{23}$, wherein $R_{22}$ and $R_{23}$ are independently selected from hydrogen, $C_3$–$C_8$-cycloalkyl, $C_1$–$C_6$-alkyl and $C_1$–$C_6$-alkyl substituted with $C_1$–$C_6$-alkoxy, hydroxy, halogen, $C_2$–$C_6$-alkanoyloxy, aryl and $C_3$–$C_8$-cycloalkyl; wherein $R_{22}$ and $R_{23}$ also may be combined to produce divalent radicals such as (—CH$_2$—)$_{4-6}$ and —CH$_2$CH$_2$—L—CH$_2$CH$_2$—, wherein L is a divalent linking group selected from —O—, —S—, —SO$_2$— and —N(R$_{24}$), wherein $R_{24}$ is selected from hydrogen, $C_1$–$C_6$-alkyl, aryl, aroyl, $C_2$–$C_6$-akanoyl, $C_1$–$C_6$-alkylsulfonyl and arylsulfonyl; and $R_1$, $R_2$, $R_{15}$, $R_{16}$, —X—, Q and n are defined above.

The thermally stable photopolymerizable colorants of Formula I may be prepared by reacting sulfonyl chlorides of Formula II with amines of Formula III,

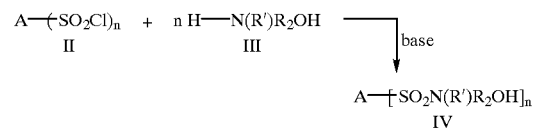

wherein R' is selected from hydrogen, $C_1$–$C_6$ alkyl, substituted $C_1$–$C_6$ alkyl, $C_3$–$C_8$-cycloalkyl, aryl and —R$_2$OH, in the presence of base or enough excess amine reactant III to serve as acid acceptor. Typical useful bases are alkali metal carbonates, alkali metal bicarbonates, trialkylamines, etc. The reactions may be carried out in excess amine reactant HN(R')R$_2$OH or in solvents such as ketones, pyridine, N,N-dimethylformamide (DMF), N-methyl-2-pyrrolidinone (NP), N,N-dimethylacetamide (DMAC), sulfolane, etc. The colored intermediate hydroxy compounds IV thus produced are then acylated with one or more ethylenically-unsaturated, acylating agent to yield the colorants of Formula I. Examples of the ethylenically-unsaturated acylating agents include compounds having the formulas:

Ib

IIb

IIIb

IVb

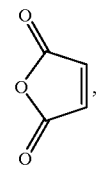

Vb

Vlb

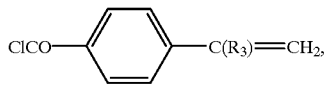

-continued

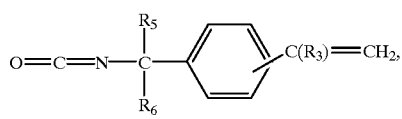
VIIb

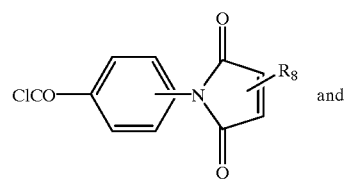
VIIIb
and

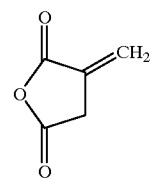
IXb

Examples of intermediate sulfonyl chlorides II useful in the practice of the invention are described in U.S. Pat. Nos. 4,403,092; 5,372,864; 5,453,482; 6,022,944 and Published PCT Application WO 98/23690. Additional sulfonyl chlorides of formula II are known and/or can be prepared according to published procedures.

COLORANT EXAMPLES

The thermally-stable, colored, photopolymerizable compounds containing a vinyl group provided by the present invention and the preparation thereof are further illustrated by the following examples:

Example 1

A mixture of 1,5-bis-[5-(N-ethyl-N-(2-hydroxyethyl) sulfamoyl)-2-methoxyanilino]anthraquinone (U.S. Pat. No. 5,372,864, Example 21) (2.0 g, 2.66 mmol) and toluene (10 mL) was stirred and most of the toluene was removed under reduced pressure. DMF (50 mL), 4-(dimethylamino) pyridine (D)MAP) (65 mg), triethylamine (1.1 mL), hydroquinone (20 mg) and methacrylic anhydride (1.22 g, 7.98 mmol) were added and the reaction mixture was stirred overnight at room temperature for about 15 hours. The functionalized blue dye was precipitated by drowning into water (200 mL) and allowing the mixture to stand for several days at room temperature and was collected by filtration washed with water and dried in vacuo. Essentially a quantitative yield was obtained. FDMS supported the following structure:

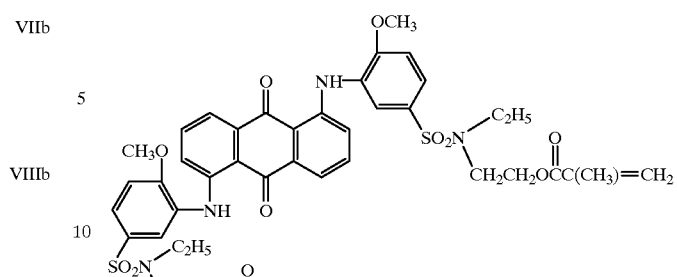

An absorption maximum at 527 nm in DMF solution was observed in the UV-visible absorption spectrum.

Example 2

A mixture of 1,5-bis-[5-(N-ethyl-N-(2-hydroxyethyl) sulfamoyl-2-methoxyanilino]-anthraquinone (U.S. Pat. No. 5,372,864, Example 21) (2.0 g, 2.66 mmol) and toluene (10 mL) were stirred and most of the toluene removed under reduced pressure. DMF (50 mL), DMAP (65 mg), triethylamine (1.1 mL), hydroquinone (20 mg) and crotonic anhydride (1.23 g, 7.98 mmol) were added. After being stirred at room temperature for 24 hours the reaction mixture was drowned into water (200 mL) and the mixture allowed to stand for awhile. The functionalized red dye was collected by filtration, washed with water and dried in vacuo. The yield was 1.96 g of product (83% of the theoretical yield). FDMS supported the following structure:

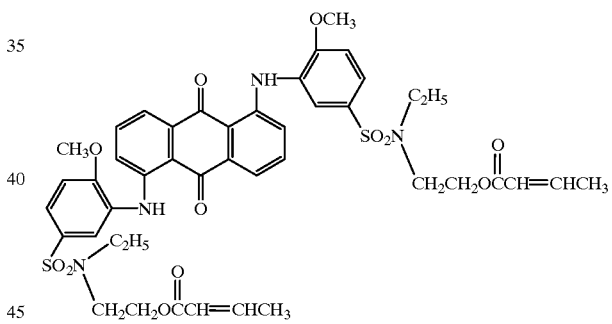

An absorption maximum at 529 nm was observed in the UV-visible light absorption spectrum.

Example 3a

To chlorsulfonic acid (10.0 ml) was added portionwise with stirring 3-methyl-6-(p-toluidino)-3H-dibenz-[f, ij]-isoquinoline-2,7-dione (2.0 g, 0.00546 m) allowing the temperature to rise. The reaction mixture was stirred for 1.0 hour with no cooling or heating and then gradually poured into 50 ml of saturated sodium chloride solution with ice added for cooling. The red sulfonyl chloride product was collected by filtration, washed with water and then added to diethanolamine (25 ml). The reaction mixture was stirred occasionally and heated at 95–100° C. for 30 minutes. The reaction mixture was drowned into 100 ml of water plus 50 ml of saturated sodium chloride solution and the resulting mixture was heated to about 80° C. and then filtered by vacuum filtration. After being washed with water the red product was dried in air (yield—2.4 g, 80% of the theoretical yield).

Example 3b

A portion of the sulfonamide product from Example 3a (1.0 g, 0.00187 m), N,N-dimethylformamide (DMF) (25 ml), hydroquinone (10 mg) and 4-dimethylaminopyridine (DMAP) (46 mg) were mixed together and the reaction mixture was stirred while methacrylic anhydride (0.838 ml) was added followed by the dropwise addition of triethylamine (0.785 ml). After being stirred at room temperature for 24 hours, the reaction mixture was drowned into water (50 ml).

The dark red product was collected by filtration, washed with water and dried in air (yield 1.0 g), 80% of the theoretical yield). FDMS supports the following structure:

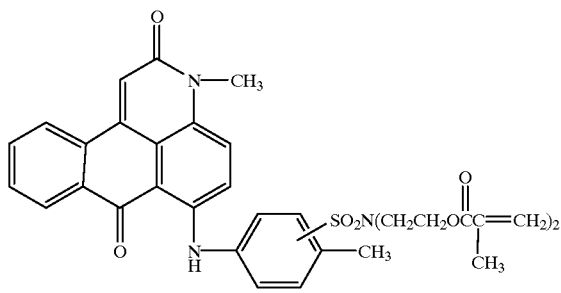

An absorption maximum was observed at 534 nm in the UV-visible absorption spectrum.

Example 4a

To chlorosulfonic acid (95.0 g) was added 1-amino-2-bromo-4-(o-anisidino) anthraquinone (12.69 g), 0.03 mol) portionwise with stirring, at 25–29° C., over about 1.25 hours. After being heated at about 75° C. for 0.5 hour, the reaction mixture was drowned into isopropanol (10 L) with stirring and using an ice bath for cooling. After being stirred for 15 minutes, the drowning mixture was filtered by vacuum and the collected solid was washed with isopropanol and dried in a vacuum oven at room temperature (yield—12.01 g, 77% of the theoretical yield).

Example 4b

A portion of the 1-amino-2-bromo-4-(5'-chlorosulfonyl-2'-methoxy)anilino-anthraquinone from Example 4a (5.21 g, 0.01 mol) was mixed and stirred with tetrahydrofuran (THF) (125 ml). To this stirred mixture was added a solution of diethanolamine (3.18 g, 0.03 m) which was dissolved in THF. After stirring the reaction mixture for 50 minutes at room temperature, the THF was removed by using a vacuum rotary evaporator. The product was dissolved in 2-ethoxyethanol (175 ml) and this solution was then drowned into cold water (800 ml) to yield the solid blue product, which was collected by filtration, reslurried in hot water, filtered, washed with hot water and dried in air (yield—3.66 g, 62% of the theoretical yield). FDMS showed the structure to be 1-amino-2-bromo-4[5'-(N,N-bis-2-hydroxyethyl)-sulfamoyl)-2'-methoxyanilino] anthraquinone.

Example 4c

A portion (1.0 g, 0.00169 mol) of the product from Example 4b, DMF (25.0 ml), hydroquinone (10 mg) and DMAP (41 mg) were mixed and stirred while methacrylic anhydride (0.757 ml) was added followed by the dropwise addition of triethylamine (0.708 ml). The reaction mixture was stirred at ambient temperature for 24 hours and then drowned into water (50 ml). The solid product was collected by filtration, washed with water and dried in air (yield—1.23 g, 84% of the theoretical yield). FDMS supported the following structure:

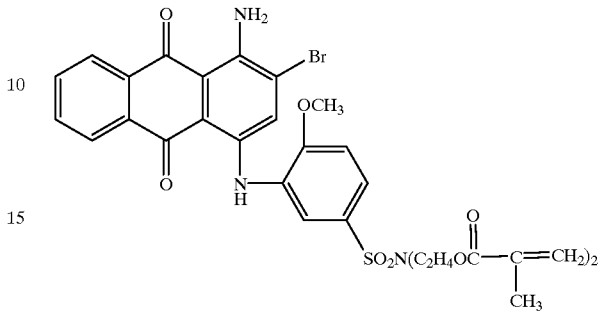

An absorption maximum was observed at 587 nm in the UV-Visible absorption spectrum in DMF as solvent.

Example 5a

To chlorosulfonic acid (95 ml) was added portionwise 1,4-bis-(2',4'-dimethylanilino)anthraquinone (13.38 g, 0.03 mol) with stirring at 25–28° C. The reaction mixture was stirred at room temperature for 1.5 hours, heated for 30 minutes at 65–70° C. and then heated at about 95° C. for 40 minutes. After being cooled to room temperature, the reaction mixture was drowned by gradual addition to cold isopropanol (4.0 L). The product was collected by filtration, washed with isopropanol and then dried at room temperature under vacuum (yield—17.84 g, 92% of the theoretical yield).

Example 5b

A portion (6.43 g, 0.01 mol) of the sulfonyl chloride product of Example 5a, acetone (25 ml) and 2-aminoethanol (75 ml) was heated at about 95° C. with stirring for 2.5 hours. The reaction mixture was cooled, diluted with 2-ethoxyethanol (175 ml) and then drowned into cold water (800 ml). The dark blue product was collected by filtration, washed with hot water and dried in air (yield—5.39 g, 78% of the theoretical yield).

Example 5c

A portion of the sulfonamide product of Example 5b (1.0 g, 0.0014 mol), DMF (10 ml), hydroquinone (10 mg), DMAP (35 mg) and methacrylic anhydride (0.647 ml) were mixed and stirred together. Triethylamine (0.605 ml) was added dropwise and the reaction mixture was then stirred at room temperature for 24 hours and then drowned into water. The solid product was collected by filtration and dried in air (yield—1.1 g, 92% of the theoretical yield). FDMS supported the following structure:

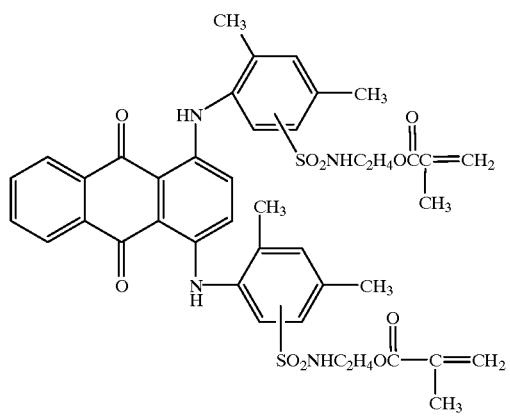

An absorption maximum was observed at 630 nm in the UV-visible absorption spectrum in DMF.

Example 6a

A mixture of isopropanol (20 ml), N-ethylethanolamine (1.11 g, 0.013 m) and an anthraquinone disulfonyl chloride prepared by chlorosulfonating 1,4-bis-(2,6-diethylanilino)anthraquinone as described in U.S. Pat. No. 6,121,351, Example 2 (1.75 g, 0.003 mol) having the structure:

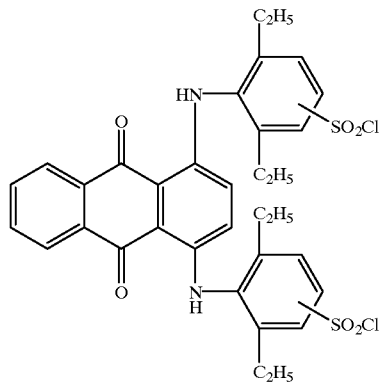

was stirred at room temperature for 3.0 hours. The reaction mixture was drowned into a solution of concentrated HCl (10 ml) in water (150 ml). After stirring for about 15 minutes, the solid product was collected by filtration, washed well with water and dried in air (yield—1.84 g, 91.5% of the theoretical yield). FDMS supported the following desired structure:

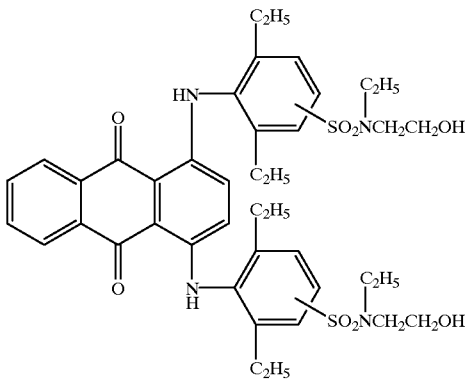

Absorption maxima at 597 nm and 622 nm were observed in the UV-visible absorption spectrum in DMF solution.

Example 6b

A portion of the sulfonamide product from Example 6a (10 g), 0.00124 mol), DMF (25 ml), hydroquinone (10 mg), DMAP (30.3 mg) and methacrylic anhydride (0.556 ml) were mixed together and stirred while triethylamine (0.520 ml) was added dropwise. The reaction mixture was stirred at room temperature for 24 hours and then drowned into water (50 ml). The solid product was collected by filtration and dried in air (yield—0.96 g, 82% of the theoretical yield). FDMS supported the following structure:

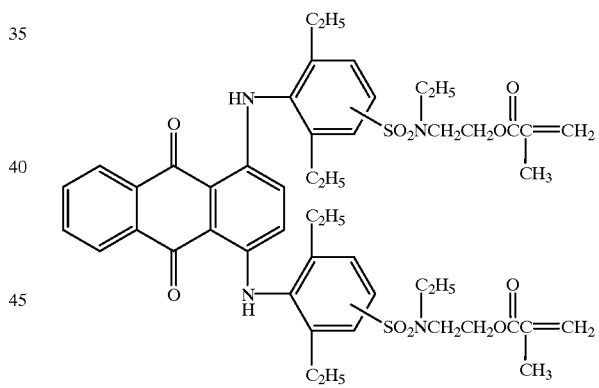

An absorption maxima at 579 nm and 623 nm were observed in the UV-Visible light absorption spectrum in DMF as solvent.

Example 7

A mixture of the copper phthalocyanine compound (0.100 g, 0.0000953 mol) prepared as in Example 1 of U.S. Pat. No. 5,102,980 and having primarily the structure $CuPc[SO_2-N-CH_2C(CH_3)_2CH_2OH]_{2.5}$, wherein CuPc represents the copper phthalocyamine moiety, DMF (5 ml), hydroquinone (1 mg), DMAP (2.3 mg), methacrylic anhydride (0.071 ml) and triethylamine (0.066 ml) was stirred at room temperature for 24 hours. The reaction mixture was poured into 10 ml of methanol and then water (25 ml) was added. A semi-solid, blue product resulted, which was washed by decantation and then allowed to dry in air. The product consists primarily of the copper phthalocyanine compound having the structure, CuPc[SO$_2$NHCH$_2$C(CH$_3$)$_2$CH$_2$OCO—C(CH$_3$)=CH$_2$]$_{2.5}$ and produces a brilliant cyan color when dissolved in DMF.

Additional examples of the thermally-stable, colored, photopolymerizable compounds of the present invention are set forth in the examples of Tables I, II, III, IV, V, VI, VII, VIII and IX. These compounds may be prepared by procedures analogous to those described in the preceding examples and/or by published techniques.

TABLE I 1,4-Bis(arylamino)anthraquinone Colorants of Formula XIV

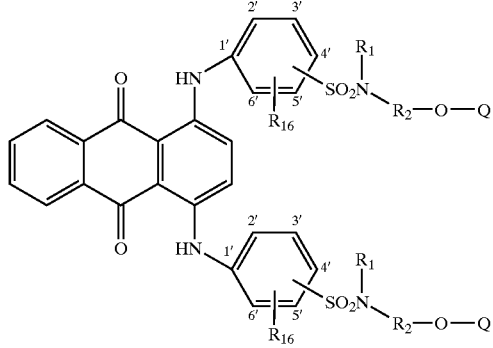

XIV

| Example No. | R$_{16}$ | R$_1$ | R$_2$ | Q |
|---|---|---|---|---|
| 8 | 2',4',6'-tri-CH$_3$ | CH$_3$ | —CH$_2$CH$_2$— | —COC(CH$_3$)=CH$_2$ |
| 9 | 2'-C$_2$H$_5$, 6'-CH$_3$ | CH$_2$CH$_3$ | —CH$_2$CH$_2$— | —COCH=CH$_2$ |
| 10 | 2',6'-di-C$_2$H$_5$ | CH$_2$CH$_2$OCO—C(CH$_3$)=CH$_2$ | —CH$_2$CH$_2$— | —COC(CH$_3$)=CH$_2$ |
| 11 | 2',6'-di-C$_2$H$_5$ | H | —CH$_2$CH$_2$OCH$_2$CH$_2$— | —COCH=CH—CH$_3$ |
| 12 | 2',6'-di-C$_2$H$_5$ | H | —CH$_2$CH$_2$(OCH$_2$CH$_2$)$_2$— | —COC(CH$_3$)=CH$_2$ |
| 13 | 2',4',6'-tri-CH$_3$ | H | —CH$_2$CH$_2$(OCH$_2$CH$_2$)$_3$— | —COC(CH$_3$)=CH$_2$ |
| 14 | 2',4',6'-tri-CH$_3$ | H | —CH$_2$CH(CH$_3$)— | —COCOCH=CHC$_6$H$_5$ |
| 15 | 2',6'-diBr,4'-CH$_3$ | H | —CH$_2$-1,4-C$_6$H$_{10}$-—CH$_2$— | —COC(CH$_3$)=CH$_2$ |
| 16 | 2'-Br, 4',6'-di-CH$_3$ | H | (CH$_2$)$_4$ | —COC(CH$_3$)=CH-(2-furyl) |
| 17 | 2'OCH$_3$ | H | (CH$_2$)$_6$ | —COCH=CH—CO$_2$CH$_3$ |
| 18 | 4',—CH$_3$ | H | —CH$_2$CH(OH)CH$_2$— | —CONHCOC(CH$_3$)=CH$_2$ |
| 19 | 2'-OCH$_3$,5'-CH$_3$ | H | -1,4-C$_6$H$_4$— | —CONHC(CH$_3$)$_2$OCOCH=CH$_2$ |
| 20 | 4'-OCH$_3$ | H | -1,4-C$_6$H$_{10}$— | —COC(CH$_3$)$_2$NHCOC(CH$_3$)=CH$_2$ |
| 21 | 2',6'-diC$_2$H$_5$ | H | —CH$_2$CH(C$_6$H$_5$)— | —CO-1,4-C$_6$H$_4$—CH=CH$_2$ |
| 22 | 2',6'-diC$_2$H$_5$ | H | —CH$_2$CH(OCH$_3$)CH$_2$— | CONHC(CH$_3$)$_2$-1,3-C$_6$H$_4$—CH=CH$_2$ |
| 23 | 2',6'-diC$_2$H$_5$ | C$_6$H$_5$ | —CH$_2$CH$_2$— | —CO-(4-maleimidophenyl) |
| 24 | 2',6'-diC$_2$H$_5$ | C$_6$H$_{11}$ | —CH$_2$CH$_2$— | —COCH$_2$C(=CH$_2$)CO$_2$CH$_3$ |
| 25 | 2',6'-diC$_2$H$_5$ | CH$_2$C$_6$H$_5$ | —CH$_2$CH$_2$— | —CO-(4-vinylphenyl) |
| 26 | 2',6'-diC$_2$H$_5$ | CH$_2$CH$_2$OCO—NHCOC(CH$_3$)=CH$_2$ | —CH$_2$CH$_2$— | —CONHCOC(CH$_3$)=CH$_2$ |

TABLE II 1,5-Bis(arylamino)anthraquinone Colorants of Formula XV

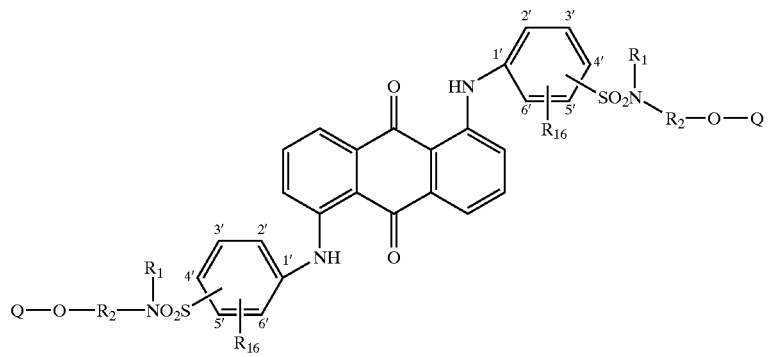

XV

| Example No. | R$_{16}$ | R$_1$ | R$_2$ | Q |
|---|---|---|---|---|
| 27 | 2'-OCH$_3$ | H | —CH$_2$CH$_2$— | —COC(CH$_3$)=CH$_2$ |
| 28 | 2'-OCH$_3$ | —CH$_2$CH$_2$OCO—C(CH$_3$)=CH$_2$ | —CH$_2$CH$_2$— | —COC(CH$_3$)=CH$_2$ |
| 29 | 2'-OC$_2$H$_5$ | H | —(CH$_2$)$_3$— | —COCH=CH$_2$ |
| 30 | 2'-OC$_2$H$_5$ | —CH$_3$ | —CH$_2$CH$_2$— | —COC(CH$_3$)=CH$_2$ |
| 31 | 2'-OCH(CH$_3$)$_2$ | —C$_2$H$_5$ | —CH$_2$CH$_2$— | —CONHCOC(CH$_3$)=CH$_2$ |
| 32 | 2'-OCH(CH$_3$)$_2$ | H | —(CH$_2$)$_6$— | —CONHC(CH$_3$)$_2$-C$_6$H$_4$-C(CH$_3$)=CH$_2$ |
| 33 | 2'-OC$_4$H$_9$-n | H | —CH$_2$CH(CH$_3$)— | —CONH(CH$_2$)$_6$OCOC(CH$_3$)=CH$_2$ |
| 34 | 2'-OCH$_3$,5'-CH$_3$ | —C$_6$H$_5$ | —CH$_2$CH$_2$— | —COC(CH$_3$)$_2$NHCOCH=CH$_2$ |
| 35 | 2'OCH$_3$,5'-Cl | —C$_6$H$_{11}$ | —CH$_2$CH$_2$— | —CO-C$_6$H$_4$-N-maleimide |
| 36 | 2',6'-diC$_2$H$_5$ | H | —CH$_2$CH$_2$— | —COC(CH$_3$)=CH$_2$ |
| 37 | 4'-OCH$_3$ | —CH$_2$C$_6$H$_5$ | —CH$_2$CH$_2$— | —CONHC(CH$_3$)$_2$-C$_6$H$_4$-C(CH$_3$)=CH$_2$ |
| 38 | 2-OCH$_3$ | H | —CH$_2$CH$_2$OCH$_2$CH$_2$— | —COCH=CH$_2$ |
| 39 | 2'-OCH$_3$ | H | —CH$_2$CH$_2$(OCH$_2$CH$_2$)$_2$— | —COC(CH$_3$)=CH$_2$ |
| 40 | 2'-OCH$_3$ | H | —CH$_2$CH$_2$(OCH$_2$CH$_2$)$_3$— | —COC(CH$_3$)=CH$_2$ |
| 41 | 2'-OCH$_3$ | H | —CH$_2$-C$_6$H$_{10}$-CH$_2$— | —COCH=CH-C$_6$H$_4$-OMe |

TABLE III 1,2,4-Trisubstituted Anthraquinone Colorants of Formula XVI

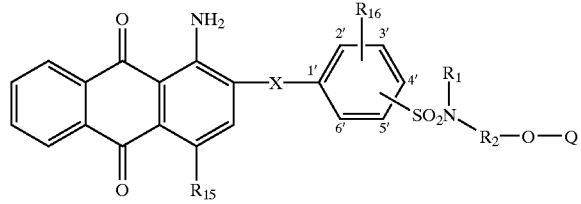

XVI

| Example No. | $R_{15}$ | $R_{16}$ | X | $R_1$ | $R_2$ | Q |
|---|---|---|---|---|---|---|
| 42 | —OH | H | O | H | —CH$_2$CH$_2$— | —COC(CH$_3$)=CH$_2$ |
| 43 | —OH | H | O | —CH$_2$CH$_2$O—COC(CH$_3$)=CH$_2$ | —CH$_2$CH$_2$— | —COC(CH$_3$)=CH$_2$ |
| 44 | —OH | H | S | —C$_2$H$_5$ | —CH$_2$CH$_2$— | —COCH=CH$_2$ |
| 45 | —OH | H | S | —CH$_3$ | —CH$_2$CH$_2$— | —CONHC(CH$_3$)$_2$-C$_6$H$_4$-C(CH$_3$)=CH$_2$ |
| 46 | —OH | 2'-OCH$_3$ | O | —C$_6$H$_5$ | —CH$_2$CH$_2$— | COCH=CH—C$_6$H$_5$ |
| 47 | —OH | 4'OCH$_3$ | O | —CH$_3$ | —CH$_2$CH$_2$— | —COCH=CH-(2-thienyl) |
| 48 | —OH | 4'CH$_3$ | S | H | —(CH$_2$)$_4$— | —COCH=CH=CO$_2$H |
| 49 | —OH | 3'OCH$_3$ | S | H | —CH$_2$CH$_2$OCH$_2$CH$_2$— | —COCH=CH—CH$_3$ |
| 50 | —NHSO$_2$CH$_3$ | H | O | H | —CH$_2$CH$_2$(OCH$_2$CH$_2$)$_2$— | —COC(CH$_3$)=CH$_2$ |
| 51 | —NHSO$_2$C$_6$H$_5$ | H | O | —CH$_2$CH$_2$O—COCH=CH$_2$ | —CH$_2$CH$_2$— | —COCH=CH$_2$ |
| 52 | —NHSO$_2$C$_6$H$_{11}$ | H | S | H | —CH$_2$CH$_2$(OCH$_2$CH$_2$)$_3$— | —COC(CH$_3$)=CH$_2$ |
| 53 | —NHCOC$_6$H$_5$ | H | O | —C$_2$H$_5$ | —CH$_2$CH$_2$— | —CONHCOC(CH$_3$)=CH$_2$ |
| 54 | —NH$_2$ | H | O | —C$_2$H$_5$ | —(CH$_2$)$_6$— | —COC(CH$_3$)=CH$_2$ |
| 55 | —NHC$_2$H$_5$ | H | S | —C$_6$H$_5$ | —CH$_2$CH$_2$— | —CO-C$_6$H$_4$-CH=CH$_2$ |
| 56 | —SC$_2$H$_5$ | H | S | —C$_6$H$_{11}$ | —CH$_2$CH$_2$— | —CO-C$_6$H$_4$-N-maleimide |
| 57 | NHCONHC$_2$H$_5$ | H | O | H | —CH$_2$CH(OH)CH$_2$— | —COCH=CH$_2$ |

TABLE IV 1,2,4-Trisubstituted Anthraquinone Colorants of Formula XVII

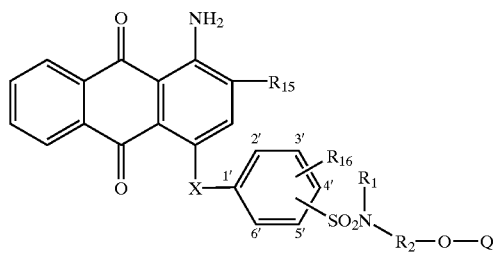

XVII

| Example No. | R15 | R16 | X | R1 | R2 | Q |
|---|---|---|---|---|---|---|
| 58 | —Br | 2'-OCH$_3$ | NH | H | —CH$_2$CH$_2$— | —COC(CH$_3$)=CH$_2$ |
| 59 | —Cl | 4'-CH$_3$ | NH | —CH$_2$CH$_2$O—COC(CH$_3$)=CH$_2$ | —CH$_2$CH$_2$— | —COC(CH$_3$)=CH$_2$ |
| 60 | H | 2'-OCH$_3$, 4'-CH$_3$ | NH | —C$_2$H$_5$ | —CH$_2$CH$_2$— | —COCH=CH$_2$ |
| 61 | H | 2'-OC$_2$H$_5$ | NH | —CH$_3$ | —CH$_2$CH$_2$— | —COCH=CH—CH$_3$ |
| 62 | —OCH$_3$ | H | NH | H | —(CH$_2$)$_4$— | —CONHCOC(CH$_3$)=CH$_2$ |
| 63 | —OC$_6$H$_5$ | H | NH | H | —(CH$_2$)$_6$— | —COCH=CH—(2-furyl) |
| 64 | —SO$_2$C$_6$H$_5$ | 2'-OCH$_3$ | NH | H | —CH$_2$CH$_2$OCH$_2$CH$_2$— | —COCH=CH—CO$_2$C$_2$H$_5$ |
| 65 | —SC$_6$H$_5$ | 2'-OCH$_3$ | NH | H | —CH$_2$CH$_2$(OCH$_2$CH$_2$)$_2$— | —COCH=CH$_2$ |
| 66 | —S-(benzothiazol-2-yl) | 2'-OCH$_3$ | NH | H | —CH$_2$CH$_2$(OCH$_2$CH$_2$)$_3$— | —COC(CH$_3$)=CH$_2$ |
| 67 | —S-(benzoxazol-2-yl) | 2'-OCH$_3$ | NH | H | —CH$_2$CH(OH)CH$_2$— | —COC(CH$_3$)=CH$_2$ |
| 68 | —SC$_2$H$_5$ | 2'-OCH$_3$ | NH | H | —CH$_2$CH(CH$_3$)— | —CO-(3-(N-maleimido)phenyl) |
| 69 | —Br | 4'-CH$_3$ | S | H | —CH$_2$OH(C$_6$H$_5$)— | —COCH=CH$_2$ |
| 70 | —SC$_2$H$_5$ | 4'-CH$_3$ | S | H | —CH$_2$CH$_2$— | —COC(CH$_3$)=CH$_2$ |
| 71 | —OCH$_3$ | 4'-CH$_3$ | S | H | —(CH$_2$)$_3$— | —COC(CH$_3$)=CH$_2$ |
| 72 | —OC$_4$H$_9$-n | 4'-CH$_3$ | S | —C$_4$H$_9$-n | —CH$_2$CH$_2$— | —COCH=CH$_2$ |
| 73 | —SO$_2$N(CH$_3$)$_2$ | 4'-CH$_3$ | S | H | —CH$_2$CH$_2$— | —COCH=CH—CH$_3$ |
| 74 | —CF$_3$ | 4'-CH$_3$ | S | H | —CH$_2$CH$_2$— | —COC(CH$_3$)=CH$_2$ |

TABLE V
Miscellaneous Anthraquinone Colorant Formulas
EXAMPLE 75
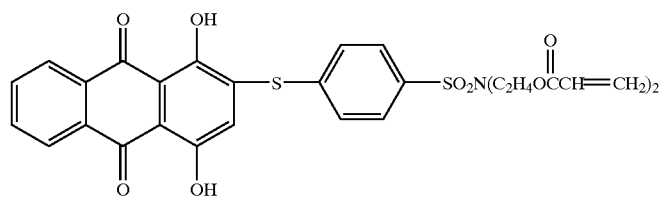
EXAMPLE 76
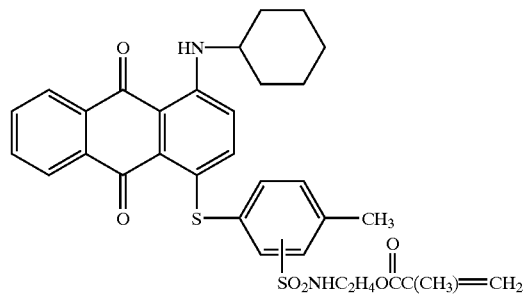
EXAMPLE 77
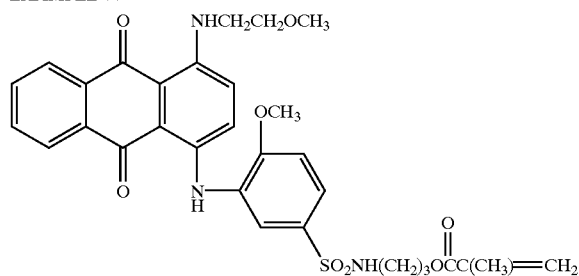
EXAMPLE 78
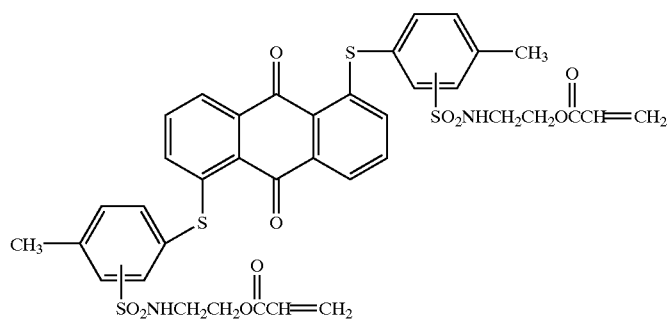
EXAMPLE 79
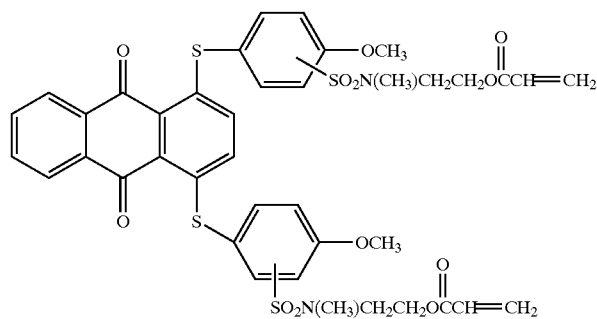
EXAMPLE 80

TABLE V-continued
Miscellaneous Anthraquinone Colorant Formulas
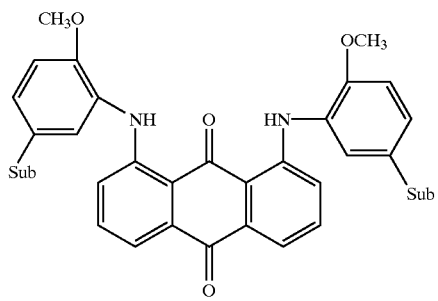
EXAMPLE 81
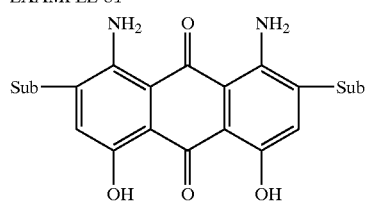
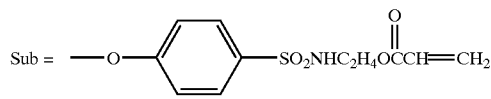
EXAMPLE 82
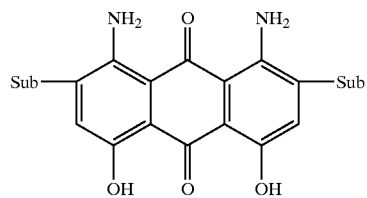
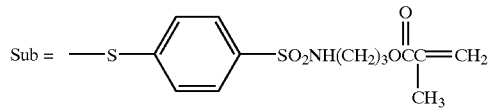
EXAMPLE 83
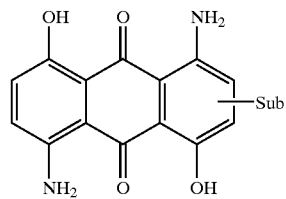
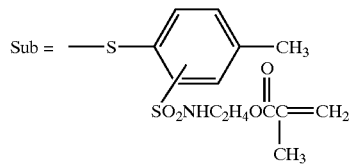
EXAMPLE 84

TABLE V-continued
Miscellaneous Anthraquinone Colorant Formulas
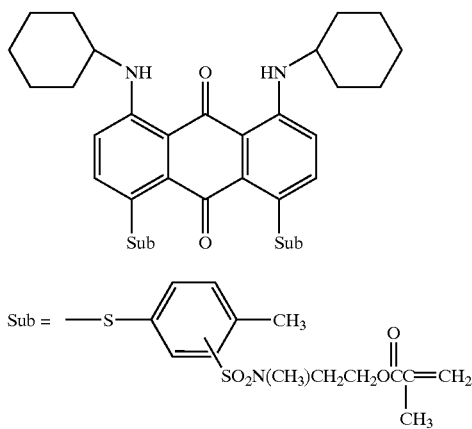
EXAMPLE 85
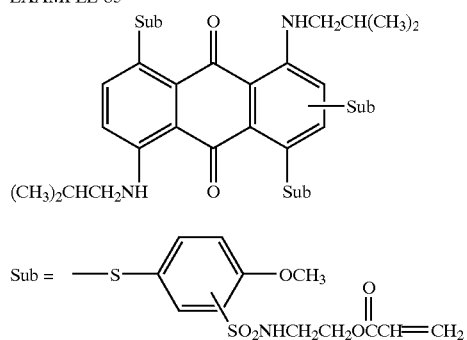
TABLE VI
Anthraquinone Compounds of Formula XI
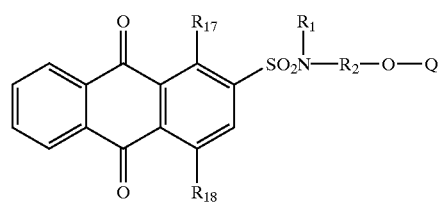
XI
| Example No. | $R_{17}$ | $R_{18}$ | $R_1$ | $R_2$ | Q |
|---|---|---|---|---|---|
| 86 | —$NH_2$ | Br | H | —$CH_2CH_2$— | —$COC(CH_3)$=$CH_2$ |
| 87 | —$NH_2$ | —S—$C_6H_5$ | —$CH_2CH_2O$—$COC(CH_3)$=$CH_2$ | —$CH_2CH_2$— | —$COC(CH_3)$=$CH_2$ |
| 88 | —$NH_2$ | ![S-phenyl-CO2CH3] | H | —$(CH_2)_4$— | —$COCH$=$CH$—$CH_3$ |
| 89 | —$NH_2$ | ![S-phenyl-C(CH3)3] | —$CH_3$ | —$CH_2CH_2OCH_2CH_2$— | —$COCH$=$CH$—$C_6H_5$ |

TABLE VI-continued

Anthraquinone Compounds of Formula XI

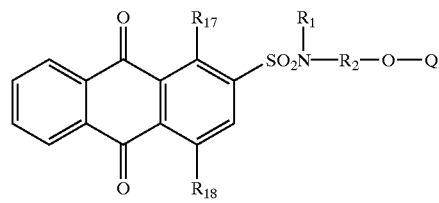

| Example No. | $R_{17}$ | $R_{18}$ | $R_1$ | $R_2$ | Q |
|---|---|---|---|---|---|
| 90 | —$NH_2$ | —S-benzoxazol-2-yl | —$C_2H_5$ | —$CH_2CH_2(OCH_2CH_2)_2$— | —CO-(4-(3-methylmaleimido)phenyl) |
| 91 | —$NH_2$ | —S-benzoxazol-2-yl | —$C_6H_5$ | —$CH_2CH_2(OCH_2CH_2)_2$— | —$CONHC(CH_3)_2$-(3-isopropenylphenyl) |
| 92 | —$NH_2$ | —S-(1-methyl-1,2,4-triazol-3-yl) | —$C_5H_9$ | —$CH_2CH(OH)CH_2$— | —$CONHCOC(CH_3)$=$CH_2$ |
| 93 | —$NH_2$ | —$SCH_2CH_2OCOCH_3$ | H | —$CH_2CH(OCOCH_3)CH_2$— | —COCH=$CH_2$ |
| 94 | —$NH_2$ | —NH-phenyl | H | —$CH_2CH(CH_3)$— | —COCH=CH-(thien-2-yl) |
| 95 | —$NH_2$ | —NH-(2-chlorophenyl) | H | —$(CH_2)_6$— | —$COC(=CH_2)CH_2CO_2CH_3$ |
| 96 | —$NH_2$ | —NH-(2-methylphenyl) | H | —$CH_2CH(C_6H_5)$— | —$COC(CH_3)$=$CH_2$ |
| 97 | —$NH_2$ | —NH-(2-methylphenyl) | H | —(1,4-phenylene)-$CH_2CH_2$— | —COCH=$CH_2$ |
| 98 | —$NH_2$ | —NH-cyclohexyl | H | —$CH_2CH_2$— | —$COC(CH_3)$=$CH_2$ |

TABLE VII

Anthrapyridone Colorants of Formula XVIII

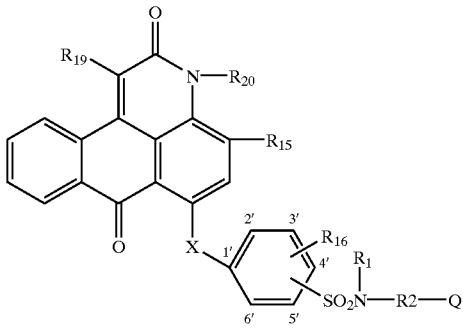

XVIII

| Example No. | $R_{15}$ | $R_{16}$ | X | $R_{19}$ | $R_{20}$ | $R_1$ |
|---|---|---|---|---|---|---|
| 99 | H | H | NH | H | —$CH_3$ | —$CH_2CH_2O$—$C(CH_3)CH$=$CH_2$ |
| 100 | H | 4'-$CH_3$ | NH | —CN | —$CH_2CH_3$ | H |
| 101 | —$CH_3$ | 4'-$CH_3$ | NH | —CN | H | —$CH_3$ |
| 102 | H | 4'-$CH_3$ | NH | $CO_2C_2H_5$ | —$CH_3$ | —$CH_2CH_3$ |
| 103 | —Br | 4'-$CH_3$ | NH | $CO_2C_2H_5$ | H | —$CH_2CH_2$—$C(CH_3)CH$=$CH_2$ |
| 104 | —S—$C_6H_5$ | 4'-$CH_3$ | NH | $CO_2C_2H_5$ | H | —$C_6H_5$ |
| 105 | —$SO_2C_6H_5$ | 4'-$CH_3$ | NH | $CO_2C_2H_5$ | H | H |
| 106 | —$OC_6H_5$ | H | NH | $CO_2C_2H_5$ | H | —$C_4H_9$-n |
| 107 | H | 4'$C_2H_5$ | S | —$COC_6H_5$ | —$CH_2C_6H_5$ | H |
| 108 | H | 2'-$CH_3$ | S | —$COCH_3$ | —$CH_2CH(CH_3)_2$ | H |
| 109 | H | 4'$C_6H_{11}$ | S | —S—$C_6H_5$ | —$CH_2CH_2OC_2H_5$ | H |
| 110 | H | 4'-$SC_2H_5$ | S | $SO_2C_6H_5$ | —$CH_2C(CH_3)_2CH_2OH$ | H |

| Example No. | $R_2$ | Q |
|---|---|---|
| 99 | —$CH_2CH_2$— | —$COC(CH_3)$=$CH_2$ |
| 100 | —$CH_2CH_2$— | —$COCH$=$CH_2$ |
| 101 | $(CH_2)_3$ | —$COCH$=$CH$—$CH_3$ |
| 102 | $(CH_2)_4$ | —$COCH$=$CH$-$CO_2H$ |
| 103 | —$CH_2CH_2$— | —$COC(CH_3)$=$CH_2$ |
| 104 | —$CH_2CH_2$— | —CONHC(CH$_3$)$_2$-C$_6$H$_4$-C(CH$_3$)=CH$_2$ |
| 105 | —$CH_2CH_2OCH_2CH_2$— | —CO-(phenyl-N-maleimide) |
| 106 | —$CH_2CH_2(OCH_2CH_2)_2$— | —COCH=CH-(2-thienyl) |
| 107 | —$CH_2CH(CH_3)$— | —$COCH$=$CH$—$C_6H_5$ |
| 108 | —$CH_2CH_2$— | —CONHC(CH$_3$)$_2$-C$_6$H$_4$-C(CH$_3$)=CH$_2$ |

TABLE VII-continued

Anthrapyridone Colorants of Formula XVIII

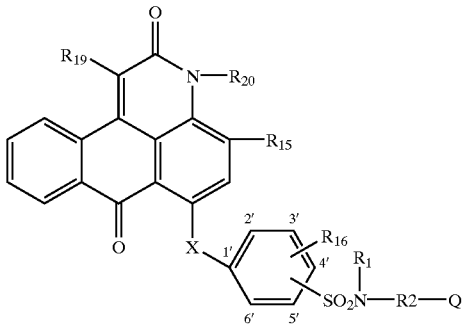

XVIII

| 109 | —CH₂—[cyclohexyl]—CH₂— | —COCH=CH₂ |

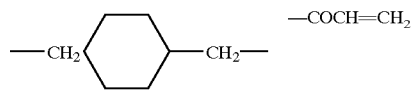

| 110 | —[phenyl]—OCH₂CH₂— | —COCH=CH—[furyl] |

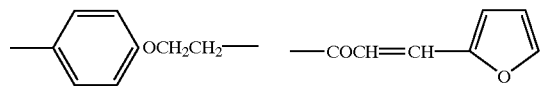

TABLE VIII

Anthrapyridone Colorants of Formula XIX

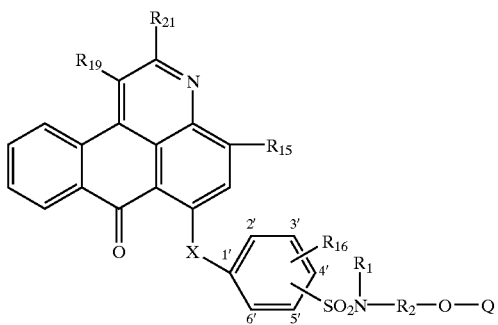

XIX

| Example No. | $R_{15}$ | $R_{16}$ | X | $R_{19}$ | $R_{21}$ | $R_1$ |
|---|---|---|---|---|---|---|
| 111 | H | 4'-CH₃ | NH | —CN | —N(CH₃)₂ | —CH₂CH₂O—COCH=CH₂ |
| 112 | H | 4'-CH₃ | NH | —CN | —N(C₂H₅)₂ | —CH₂CH₂O—COC(CH₃)=CH₂ |
| 113 | H | 2'-OCH₃ | NH | —CN | —N[morpholino] | H |
| 114 | H | 2'-OCH₃ | NH | —CN | —N[piperidino] | —CH₃ |
| 115 | H | 2'-OCH₃ | S | —CN | —N(CH₃)C₆H₅ | —CH₂CH₃ |
| 116 | H | 4'-C₂H₅ | S | —CN | —N(CH₃)C₆H₁₁ | H |
| 117 | —Br | 4'-C₆H₁₁ | S | H | H | H |
| 118 | —OC₆H₃ | 4'-OCH₃ | S | —CN | —N(CH₃)C₂H₅ | H |
| 119 | —SC₆H₅ | 4'-OCH₃ | NH | —C₆H₅ | —CH₃ | —C₆H₅ |
| 120 | —SO₂C₆H₅ | 4'-OCH₃ | NH | —CN | —N(C₄H₉-n)₂ | H |

TABLE VIII-continued

Anthrapyridone Colorants of Formula XIX

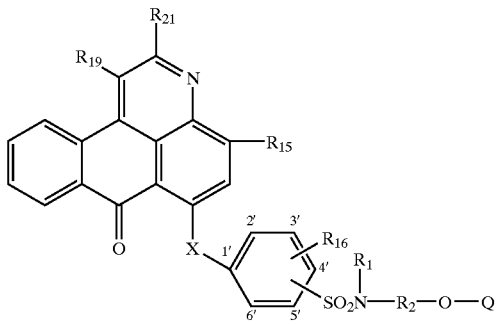

XIX

| Example No. | $R_2$ | Q |
|---|---|---|
| 111 | —$CH_2CH_2$— | —$COCH=CH_2$ |
| 112 | —$CH_2CH_2$— | —$COC(CH_3)=CH_2$ |
| 113 | —$CH_2CH_2$— | —$COCH=CH—CH_3$ |
| 114 | —$CH_2CH_2$— | —$CONHC(CH_3)_2$-[phenyl]-$C(CH_3)=CH_2$ |
| 115 | —$CH_2CH_2$— | —$COCH=CH_2$ |
| 116 | —$CH_2CH_2OCH_2CH_2$— | —$COC(CH_3)=CH_2$ |
| 117 | —$CH_2CH_2(OCH_2CH_2)_2$— | —$OCH=CH—C_6H_5$ |
| 118 | —$CH_2CH(CH_3)$— | —$COCH=CH—CO_2C_2H_5$ |
| 119 | —$CH_2CH_2$— | —$CO$-[phenyl]-N-maleimide |
| 120 | —$CH_2CH_2(OCH_2CH_2)_3$— | —$COC(CH_3)=CH_2$ |

TABLE IX

Colorants Having Miscellaneous Structures

EXAMPLE 121

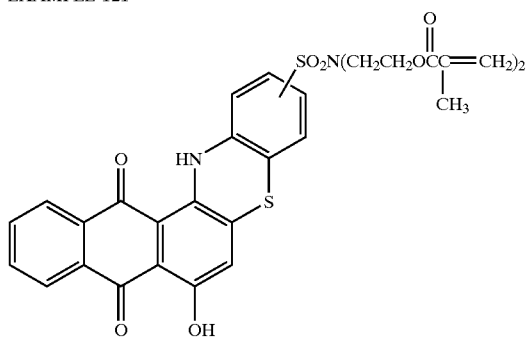

EXAMPLE 122

TABLE IX-continued
Colorants Having Miscellaneous Structures
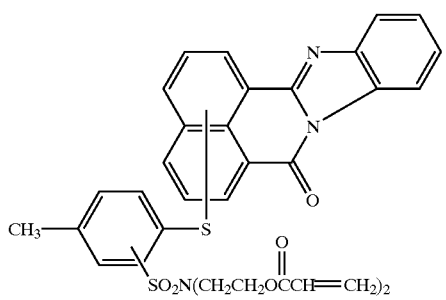
EXAMPLE 123
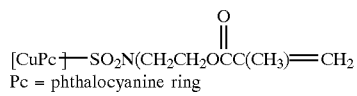
Pc = phthalocyanine ring
EXAMPLE 124
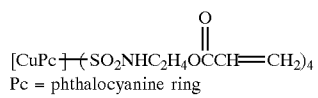
Pc = phthalocyanine ring
EXAMPLE 125
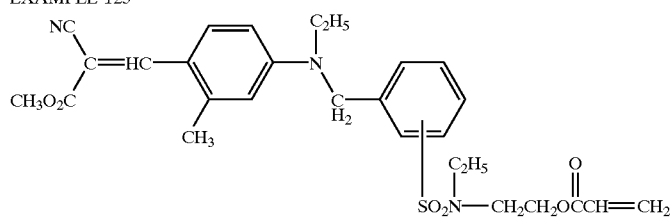
EXAMPLE 126
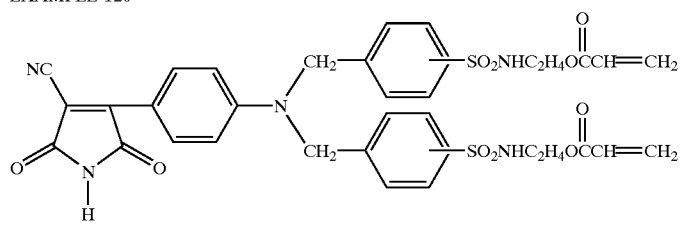
EXAMPLE 127
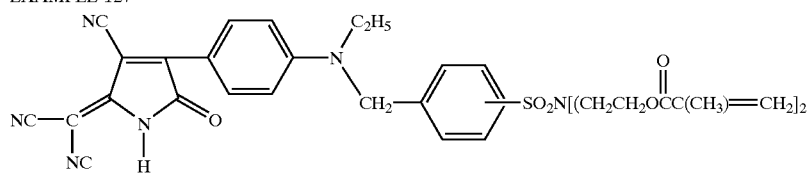
EXAMPLE 128
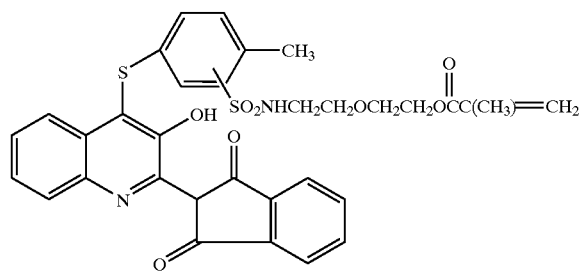

The thermally-stable, colored, photopolymerizable compounds which contain vinyl or substituted vinyl groups are polymerizable or copolymerizable, preferably by free radical mechanisms, said free radicals being generated by exposure to UV light by methods known in the art of preparing UV-cured resins. Polymerization can be facilitated by the addition of photoinitiators. The colored polymeric materials normally are prepared by dissolving the functionalized colorants containing copolymerizable groups in a polymerizable vinyl monomer with or without another solvent and then combining with an oligomeric or polymeric material which contains one or more vinyl or substituted vinyl groups.

The second embodiment of the present invention is a coating composition comprising (i) one or more polymerizable vinyl compounds, i.e., vinyl compounds which are copolymerizable with the dye compounds described herein, (ii) one or more of the dye compounds described above, and (iii) at least one photoinitiator. The polymerizable vinyl compounds useful in the present invention contain at least one unsaturated group capable of undergoing polymerization upon exposure to UV radiation in the presence of a photoinitiator, i.e., the coating compositions are radiation-curable. Examples of such polymerizable vinyl compounds include acrylic acid, methacrylic acid and their anhydrides; crotonic acid; itaconic acid and its anhydride; cyanoacrylic acid and its esters; esters of acrylic and methacrylic acids such as allyl, methyl, ethyl, n-propyl, isopropyl, butyl, tetrahydrofurfuryl, cyclohexyl, isobomyl, n-hexyl, n-octyl, isooctyl, 2-ethylhexyl, lauryl, stearyl, and benzyl acrylate and methacrylate; and diacrylate and dimethacrylate esters of ethylene and propylene glycols, 1,3-butylene glycol, 1,4-butanediol, diethylene and dipropylene glycols, triethylene and tripropylene glycols, 1,6-hexanediol, neopentyl glycol, polyethylene glycol, and polypropylene glycol, ethoxylated bisphenol A, ethoxylated and propoxylated neopentyl glycol; triacrylate and trimethacrylate esters of tris-(2-hydroxyethyl)isocyanurate, trimethylolpropane, ethoxylated and propoxylated trimethylolpropane, pentaerythritol, glycerol, ethoxylated and propoxylated glycerol; tetraacrylate and tetramethacrylate esters of pentaerythritol and ethoxylated and propoxylated pentaerythritol; acrylonitrile; vinyl acetate; vinyl toluene; styrene; N-vinyl pyrrolidinone; alpha-methylstyrene; maleate/fumarate esters; maleic/fumaric acid; crotonate esters, and crotonic acid.

The polymerizable vinyl compounds useful in the present invention include polymers which contain unsaturated groups capable of undergoing polymerization upon exposure to UV radiation in the presence of a photoinitiator. The preparation and application of these polymerizable vinyl compounds are well known to those skilled in the art as described, for example, in *Chemistry and Technology of UV and EB Formulation for Coatings, Inks, and Paints,* Volume II: Prepolymers and Reactive Diluents, G. Webster, editor, John Wiley and Sons, London, 1997. Examples of such polymeric, polymerizable vinyl compounds include acrylated and methacrylated polyesters, acrylated and methacrylated polyethers, acrylated and methacrylated epoxy polymers, acrylated or methacrylated urethanes, acrylated or methacrylated polyacrylates (polymethacrylates), and unsaturated polyesters. The acrylated or methacrylated polymers and oligomers typically are combined with monomers which contain one or more acrylate or methacrylate groups, e.g., monomeric acrylate and methacrylate esters, and serve as reactive diluents. The unsaturated polyesters, which are prepared by standard polycondensation techniques known in the art, are most often combined with either styrene or other monomers, which contain one or more acrylate or methacrylate groups and serve as reactive diluents. A second embodiment for the utilization of unsaturated polyesters that is known to the art involves the combination of the unsaturated polyester with monomers that contain two or more vinyl ether groups or two or more vinyl ester groups (WO 96/01283, WO 97/48744, and EP 0 322 808).

The coating compositions of the present invention optionally may contain one or more added organic solvents if desired to facilitate application and coating of the compositions onto the surface of substrates. Typical examples of suitable solvents include, but are not limited to ketones, alcohols, esters, chlorinated hydrocarbons, glycol ethers, glycol esters, and mixtures thereof Specific examples include, but are not limited to acetone, 2-butanone, 2-pentanone, ethyl acetate, propyl acetate, isopropyl acetate, butyl acetate, isobutyl acetate, ethylene glycol diacetate, ethyl 3-ethoxypropionate, methyl alcohol, ethyl alcohol, propyl alcohol, isopropyl alcohol, butyl alcohol, ethylene glycol, propylene glycol, ethylene glycol monomethyl ether, ethylene glycol monoethyl ether, ethylene glycol monopropyl ether, ethylene glycol monobutyl glycol, diethylene glycol monomethyl ether, diethylene glycol monoethyl ether, diethylene glycol monobutyl ether, propylene glycol monomethyl ether, diethylene glycol monobutyl ether acetate, diethylene glycol monoethyl ether acetate, ethylene glycol monobutyl ether acetate, propylene glycol monomethyl ether acetate, methylene chloride, chloroform, and mixtures thereof. The amount of added or extraneous solvent which may be present in our novel coating compositions may be in the range of about 1 to 70 weight percent, more typically about 1 to 25 weight percent, based on the total weight of the coating composition.

Certain polymerizable vinyl monomers may serve as both reactant and solvent. These contain at least one unsaturated group capable of undergoing polymerization upon exposure to UV radiation in the presence of a photoinitiator. Specific examples include, but are not limited to: methacrylic acid, acrylic acid, ethyl acrylate and methacrylate, methyl acrylate and methacrylate, hydroxyethyl acrylate and methacrylate, diethylene glycol diacrylate, trimethylolpropane triacrylate, 1,6 hexanediol di(meth)acrylate, neopentyl glycol diacrylate and methacrylate, vinyl ethers, divinyl ethers such as diethyleneglycol divinyl ether, 1,6-hexanediol divinyl ether, cyclohexanedimethanol divinyl ether, 1,4-butanediol divinyl ether, triethyleneglycol divinyl ether, trimethylolpropane divinyl ether, and neopentyl glycol divinyl ether, vinyl esters, divinyl esters such as divinyl adipate, divinyl succinate, divinyl glutarate, divinyl 1,4-cyclohexanedicarboxylate, divinyl 1,3-cyclohexanedicarboxylate, divinyl isophthalate, and divinyl terephthalate, N-vinyl pyrrolidone, and mixtures thereof.

In addition, the compositions of the present invention may be dispersed in water rather than dissolved in a solvent to facilitate application and coating of the substrate surface. In the water-dispersed compositions of the present invention a co-solvent is optionally used. Typical examples of suitable cosolvents include but are not limited to acetone, 2-butanone, methanol, ethanol, isopropyl alcohol, ethylene glycol monomethyl ether, ethylene glycol monoethyl ether, ethylene glycol monopropyl ether, and ethylene glycol monobutyl ether, ethylene glycol, and propylene glycol. Typical examples of water-soluble ethylenically unsaturated solvents include but are not limited to: methacrylic acid, acrylic acid, N-vinyl pyrrolidone, 2-ethoxyethyl acrylate and methacrylate, polyethylene glycol dimethacrylate, polypropylene glycol monoacrylate and monomethacrylate, and mixtures thereof. The amount of suitable aqueous organic solvent (i.e., organic solvent and water) in the dispersed coating compositions of the present invention is about 10 to about 90 weight percent, preferably about 75 to about 90 weight percent of the total coating composition.

The coating compositions of the present invention contain one or more of the thermally-stable, colored, photopolymerizable compounds described herein. The concentration of the colored compound or compounds may be from about 0.005 to 30.0, preferably from about 0.05 to 15.0, weight percent based on the weight of the polymerizable vinyl compound(s) present in the coating composition, i.e., component (i) of the coating compositions. The coating compositions of the present invention normally contain a photoinitiator. The amount of photoinitiator typically is about 1 to 15 weight percent, preferably about 3 to about 5 weight percent, based on the weight of the polymerizable vinyl compound(s) present in the coating composition. Typical photoinitiators include benzoin and benzoin ethers such as marketed under the tradenames ESACURE BO, EB1, EB3, and EB4 from Fratelli Lamberti; VICURE 10 and 30 from Stauffer; benzil ketals such as 2,2-dimethoxy-1,2-diphenylethan-1-one (IRGACURE 651), 2-hydroxy-2-methyl-1-phenylpropan-1-one (IRGACURE 1173), 2-methyl-2-morpholino-1-(p-methylthiophenyl)propan-1-one (IRGACURE 907), alpha-hydroxyalkylphenones such as (1-hydroxycyclohexyl)(phenyl)methanone (IRGACURE 184), 2-benzyl-2-(dimethylamino)-1-(4-morpholinophenyl) butan-1-one (IRGACURE 369), 2-hydroxy-2-methyl-1-phenylpropan-1-one IRGACURE 1173) from Ciba Geigy, Uvatone 8302 by Upjohn; alpha, alpha-dialkoxyacetophenone derivatives such as DEAP and UVA-TONE 8301 from Upjohn; DAROCUR 116, 1173, and 2959 by Merck; and mixtures of benzophenone and tertiary amines In pigmented coating compositions, the rate of cure can be improved by the addition of a variety of phosphine oxide photoinitiaters such as bis(2,4,6-trimethylbenzoyl)-phenyl-phosphine oxide (Irganox 819), Irgacure 819, 1700, and 1700 and phosphine oxide mixtures such as a 50/50 by weight mixtures of IRGACURE 1173 and 2,4,6-trimethylbenzoyldiphenylphosphine oxide (DAROCUR 4265) from Ciba. Further details regarding such photoinitiators and curing procedures may be found in the published literature such as U.S. Pat. No. 5,109,097, incorporated herein by reference. Depending upon the thickness of the coating (film), product formulation, photoinitiator type, radiation flux, and source of radiation, exposure times to ultraviolet radiation of about 0.5 second to about 30 minutes (50–5000 mJ/square cm) typically are required for curing. Curing also can occur from solar radiation, i.e., sunshine.

The coating compositions of the present invention may contain one or more additional components typically present in coating compositions. Examples of such additional components include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; and/or coalescing agents. The coating compositions of the present invention also may contain non-reactive modifying resins. Typical non-reactive modifying resins include homopolymers and copolymers of acrylic and methacrylic acid; homopolymers and copolymers of alkyl esters of acrylic and methacrylic acid such as methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; acrylated and methacrylated urethane, epoxy, and polyester resins, silicone acrylates, cellulose esters such as cellulose acetate butyrates, cellulose acetate, propionates, nitrocellulose, cellulose ethers such as methyl cellulose, ethyl cellulose, hydroxypropyl cellulose, and hydroxypropyl methyl cellulose.

Typical plasticizers include alkyl esters of phthalic acid such as dimethyl phthalate, diethyl phthalate, dipropyl phthalate, dibutyl phthalate, and dioctyl phthalate; citrate esters such as triethyl citrate and tributyl citrate; triacetin and tripropionin; and glycerol monoesters such as Eastman 18-04, 18-07, 18-92 and 18-99 from Eastman Chemical Company. Specific examples of additional additives can be found in Raw Materials Index, published by the National Paint & Coatings Association, 1500 Rhode Island Avenue, N.W., Washington, D.C. 20005.

The third embodiment of the present invention pertains to a polymeric composition, typically a polymeric coating, comprising a polymer of one or more acrylic acid esters, one or more methacrylic acid esters and/or other polymerizable vinyl compounds, having copolymerized therein one or more of the thermally-stable, colored, photopolymerizable compounds described herein. The colored polymeric compositions provided by our invention may be prepared from the coating compositions described above and typically contain from about 0.005 to 30.0 weight percent, preferably from about 05 to 15.0 weight percent, of the reactive or polymerized residue of one or more of the vinyl dye compounds described herein based on the weight of the composition or coating. The novel polymeric coatings may have a thickness of about 2.5 to 150 microns, more typically about 15 to 65 microns.

The polymeric coatings of the present invention typically have a solvent resistance of at least 100 MEK double rubs using ASTM Procedure D-3732; preferably a solvent resistance of at least about 200 double rubs. Such coatings also typically have a pencil hardness of greater than or equal to F using ASTM Procedure D-3363; preferably a pencil hardness of greater than or equal to H. The coating compositions can be applied to substrates with conventional coating equipment. The coated substrates are then exposed to radiation such as ultraviolet light in air or in nitrogen which gives a cured finish. Mercury vapor or Xenon lamps are applicable for the curing process. The coatings of the present invention can also be cured by electron beam.

The radiation-curable coating compositions of this invention are suitable as adhesives and coatings for such substrates as metals such as aluminum and steel, plastics, glass, wood, paper, and leather. On wood substrates the coating compositions may provide both overall transparent color and grain definition. Various aesthetically-appealing effects can be achieved thereby. Due to reduced grain raising and higher film thicknesses, the number of necessary sanding steps in producing a finished wood coating may be reduced when using the colored coating compositions of the invention rather than conventional stains. Coating compositions within the scope of our invention may be applied to automotive base coats where they can provide various aesthetically-appealing effects in combination with the base coats and color differences dependent on viewing angle (lower angles create longer path lengths and thus higher observed color intensities). This may provide similar styling effects as currently are achieved with metal flake orientation in base coats.

Various additional pigments, plasticizers, and stabilizers may be incorporated to obtain certain desired characteristics in the finished products. These are included in the scope of the invention.

Coating, Curing, and Testing Procedures:

Samples of formulations were used to coat glass plates using a knife blade. The wet film thickness was about 15 to 75 microns (0.6 to 3.0 mils). The solvent was evaporated to give a clear, somewhat tacky film. Prior to exposure to UV radiation, each film was readily soluble in organic solvents.

The dried film on the glass plate was exposed to UV radiation from a 200 watt per inch medium pressure mercury vapor lamp housed in an American Ultraviolet Company instrument using a belt speed of 25 ft. per minute. One to five passes under the lamp resulted in a crosslinked coating with maximum hardness and solvent resistance.

Each cured coating (film) may be evaluated for Konig Pendulum Hardness (ASTM D4366 DIN 1522), solvent resistance by the methyl ethyl ketone double-rub test, and solubility in acetone before and after exposure to UV radiation. The damping time for Konig Pendulum Hardness on uncoated glass is 250 seconds; coatings with hardness above 100 seconds are generally considered hard coatings. The methyl ethyl ketone (MEK) double rub test is carried out in accordance with ASTM Procedure D-3732 by saturating a piece of cheese cloth with methyl ethyl ketone, and with moderate pressure, rubbing the coating back and forth. The number of double rubs is counted until the coating is removed. The acetone solubility test is carried out by immersing a dry, pre-weighed sample of the cured film in acetone for 48 hours at 25° C. The film is removed, dried for 16 hours at 60° C. in a forced-air oven, and reweighed. The weight percent of the insoluble film remaining is calculated from the data.

COATING EXAMPLES

The coatings and coating compositions provided by the present invention and the preparation thereof are further illustrated by the following examples.

Example 129

A colored, photopolymerizable composition was prepared by thoroughly mixing 22.9 g of dipropylene glycol diacrylate, 69.1 g of Jaegalux UV-1500 (acrylated polyester oligomers), the blue compound of Example 6b (4 g of a 1.25% solution of the colored compound in dipropylene glycol diacrylate), and 4 g of Darocure1173 photoinitiator in a small Cowles mixer until the components were completely dispersed. This coating composition was drawn down with a wire wound rod to provide a 25.4 micron (1 mil) thick coating on an Oak wood panel. This panel was passed through a UV cure machine at a speed of 6.1 meters per minute (20 feet/minute) using a lamp with an intensity of 118.1 watts per cm (300 watts per inch). Hardness measurements were conducted on glass using a Konig pendulum and did not indicate any significant loss of hardness due to incorporation of the dye; hardness was 83 Konig seconds. Adhesion of the coating to an oak wood panel was measured using the crosshatch adhesion method according to ASTM method D 3359 (ISO 2409). A right angle lattice pattern (6 lines in each direction) is cut into the coating, penetrating to the substrate, creating 25 squares with each side of the squares measuring 1 mm. A 2.5 cm (1 inch) wide piece of tape is applied to the lattice, pressure is applied, and then the tape is pulled from the substrate. If the edges are smooth and none of the squares are detached, the adhesion is 100% (ASTM rating 5B). On the wood panel a 5B rating was achieved for both the reference and the dye-containing coatings. All the coatings withstood more than 300 MEK double rubs. No loss of solvent resistance was observed with incorporation of the dye.

Example 130

A colored, photopolymerizable composition was prepared by thoroughly mixing 10.0 g dipropylene glycol diacrylate, 10.0 g tripropylene gylcol triacrylate, 20.0 g Jaegalux UV-1500 (acrylated polyester oligomers), 15 g Jaegalux UV-3800 (acrylated epoxy oligomers), the blue compound of Example 6b (5.5 g of a 1.25% solution of the dye in dipropylene glycol diacrylate), and 2.2 gram of Irgacure 819 photoinitiator in a small Cowles mixer until the components were completely dispersed (20 minutes at 12,000 revolutions per minute). This coating composition was drawn down with a wire wound rod to provide a 38.1 micron (1.5 mil) thick coating on a cold rolled steel panel (iron phosphate pretreatment) and on polyethylene terephthalate sheet. The coated steel panel and polyester sheet were passed through a UV cure machine at a speed of 6.1 meters per minute (20 feet/minute) using a lamp with an intensity of 118.1 watts per cm (300 watts per inch). The Konig pendulum hardness of the coatings on the steel panels was 126 Konig seconds. No significant loss of hardness (relative to the reference coating) due to incorporation of the dye was observed. All the coatings withstood more than 500 MEK double rubs. No significant loss of solvent resistance was observed with incorporation of the dye. Adhesion tests of the coatings on polyethylene terephthalate sheeting using the crosshatch adhesion method described in Example 129 showed no loss of adhesion due to incorporation of the dye and 100% adhesion for the coatings.

Example 131

A colored, photopolymerizable composition was prepared by thoroughly mixing the blue compound of Example 6b (10 g of a 2% solution of the dye in dipropylene glycol diacrylate), 20 gram trimethylol propane triacrylate, 20 g of polyester acrylate oligomer, 15 g of bisphenol A epoxy acrylate, and 4 gram of PI 1173 photoinitiator in a small Cowles mixer until the components were completely dispersed. The resulting coating composition was drawn down with a wire wound rod to provide a 25.4 micron (1 mil) thick coating on a 20 gauge sheet (1.27 mm—50 mils—thick) of polyethylene terephthalate (PET). The coated sheet was passed through a UV cure machine at a speed of 6.1 meters per minute (20 feet/minute) using a lamp with an intensity of 118.1 watts per cm (300 watts per inch). Hardness measured on glass by the Konig Pendulum method indicated no reduction of the hardness due to the dye; hardness was 105 Konig seconds. Adhesion tests of the coatings on polyethylene terephthalate sheet in accordance with the crosshatch adhesion method described in Example 129 showed no loss of adhesion due to incorporation of the dye and 100% adhesion for the coatings. All the coatings withstood more than 300 MEK double rubs. No significant loss of solvent resistance was observed with incorporation of the dye. The coating provided an attractive even color over the entire coated sheet.

The invention has been described in detail with particular reference to preferred embodiments thereof, but it will be understood that variations and modifications can be effected within the spirit and scope of the invention.

We claim:
1. A photopolymerizable colorant compound having tie formula:

$$A-(SO_2N(R_1)-R_2-O-Q)_n \quad \text{I}$$

wherein

A is a mono-, di-, tri- or tetravalent chromophore;

$R_1$ is hydrogen, $C_1$–$C_6$ alkyl, substituted $C_1$–$C_6$ alkyl, $C_3$–$C_8$ cycloalkyl, aryl or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —($-CH_2CH_2O$)$_m$—$CH_2CH_2$—;

m is 1–3;

n is 1–4;

Q is an ethylenically-unsaturated, photopolymerizable group selected from the following organic radicals:

$$-COC(R_3)=CH-R_4 \quad \text{Ia}$$

$$-CONHCOC(R_3)=CH-R_4 \quad \text{IIa}$$

$$-CONH-C_1-C_6 \text{alkylene } OCOC(R_3)=CH-R_4 \quad \text{IIIa}$$

$$-COC(R_5)(R_6)-NHCOC(R_3)=CH-R_4 \quad \text{IVa}$$

$$-COCH=CH-CO_2R_7 \quad \text{Va}$$

$$-CO-C_6H_4-C(R_3)=CH_2 \quad \text{VIa}$$

$$-CON-C(R_5)(R_6)-C_6H_4-C(R_3)=CH_2 \quad \text{VIIa}$$

$$-CO-C_6H_4-N\text{(maleimido with }R_8\text{)} \quad \text{VIIIa}$$

or $$-COCH_2C(=CH_2)CO_2R_7 \text{ and/or } -COC(=CH_2)CH_2CO_2R_7 \quad \text{IXa}$$

wherein $R_3$ is hydrogen or $C_1$–$C_6$ alkyl;

$R_4$ is hydrogen, $C_1$–$C_6$ alkyl; phenyl; phenyl substituted with one or more groups selected from $C_1$–$C_6$ alkyl, $C_1$–$C_6$ alkoxy, —N($C_1$–$C_6$ alkyl)$_2$, nitro, cyano, $C_2$–$C_6$ alkoxycarbonyl, $C_2$–$C_6$ alkanoyloxy or halogen; 1- or 2-naphthyl; 1- or 2-naphthyl substituted with $C_1$–$C_6$ alkyl or $C_1$–$C_6$ alkoxy; 2- or 3-thienyl; 2- or 3-thienyl substituted with $C_1$–$C_6$ alkyl or halogen; 2- or 3-furyl; or 2- or 3-furyl substituted with $C_1$–$C_6$ alkyl;

$R_5$ and $R_6$ are independently selected from hydrogen, $C_1$–$C_6$ alkyl, substituted $C_1$–$C_6$ alkyl, aryl or may be combined to represent a —($-CH_2-$)$_{3-5}$ radical;

$R_7$ is hydrogen or $C_1$–$C_6$ alkyl, substituted $C_1$–$C_6$ alkyl, $C_3$–$C_8$ alkenyl, $C_3$–$C_8$ cycloalkyl or aryl;

$R_8$ is selected from hydrogen, $C_1$–$C_6$ alkyl or aryl; and

A is a chromophore selected from residues of anthraquinone, anthrapyridone, anthrapyrimidine, anthrapyridine, anthrapyrazole, anthraisothiazole, 14H-naptho[2,3-a]-phenothiazine-8,13-dione, methine, bis-methine, perinone, coumarin, quinophthalone, 3-aryl-2,5-dioxypyrroline, or 3-aryl-5-dicyanomethylene-2-oxypyrroline.

2. A photopolymerizable colorant according to claim 1 having the formula $$\text{anthraquinone-}[X-C_6H_3(R_{16})-SO_2N(R_1)-R_2-O-Q]_n \text{ with } R_{15}$$

wherein $R_1$ is hydrogen, $C_1$–$C_6$ alkyl, substituted $C_1$–$C_6$ alkyl, $C_3$–$C_8$ cycloalkyl, aryl or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —($-CH_2CH_2O$)$_m$—$CH_2CH_2$—;

m is 1–3;

n is 1–4;

$R_{15}$ is hydrogen or $R_{15}$ represents 1–4 groups selected from amino; $C_1$–$C_8$-alkylamino; $C_1$–$C_8$-alkylamino substituted with one or more of hydroxy, cyano, halogen, aryl, heteroaryl, $C_3$–$C_8$-cycloalkyl, furyl, $C_1$–$C_6$-alkoxy, $C_1$–$C_6$-alkylthio, arylthio, aryloxy or —$OCH_2CH_2O(OCH_2CH_2)_{1-3}OR'$, wherein R' is hydrogen, $C_1$–$C_6$-alkyl or $C_2$–$C_6$-alkanoyloxy; $C_3$–$C_8$-cycloalkylamino; $C_3$–$C_8$-alkenylamino; $C_3$–$C_8$-alkynylamino; arylamino; furfurylamino; $C_1$–$C_6$-alkoxy; —$OCH_2CH_2(OCH_2CH_2)_{1-3}OR'$, wherein R' is as previously defined; halogen; hydroxy; $C_1$–$C_6$-alkylthio; arylthio; aryl; aryloxy; arylsulfonyl; $C_2$–$C_6$-alkanoyl; aroyl; $C_2$–$C_6$-alkanoyloxy; $C_2$–$C_6$-alkoxycarbonyl; heteroaryl; heteroarylthio; cyano; nitro; trifluoromethyl; thiocyano; —$SO_2C_1$–$C_6$-alkyl; —$SO_2NH_2$; —$SO_2NHC_1$–$C_6$-alkyl; —$SO_2N(C_1$–$C_6$ alkyl)$_2$; —$SO_2N(C_1$–$C_6$ alkyl)aryl; —$SO_2NH$-aryl; —$CONH_2$; —$CONHC_1$–$C_6$-alkyl; —$CON(C_1$–$C_6$-alkyl)$_2$; —$CONH$-aryl; —$CON(C_1$–$C_6$alkyl) aryl; $C_1$–$C_6$ alkyl; tetrahydrofurfurylamino; —$CH_2$-cyclohexane-1,4-diyl-$CH_2OR'$, wherein R' is as previously defined; or $$-NH-CH(CH_2SO_2CH_2CH_2)\text{(cyclic)};$$

$R_{16}$ is hydrogen or 1–2 groups selected from $C_1$–$C_6$-alkyl, $C_1$–$C_6$-alkoxy or halogen;

X is a covalent bond or a linking group selected from —O—, —S—, —SO$_2$—, —NHCO—, —NHSO$_2$—, —NHCONH—, —OC$_2$-C$_6$ alkylene-, —OC$_2$-C$_6$-alkylene-O—, —S—C$_2$-C$_6$-alkylene-O— or, —O(CH$_2$CH$_2$O)$_{1-3}$—; and Q is an ethylenically-unsaturated, photopolymerizable group selected from the following organic radicals:

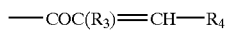   Ia

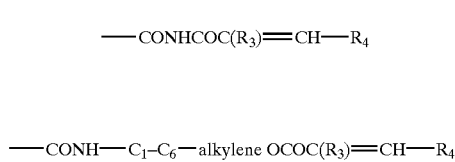   IIa, IIIa, IVa

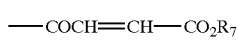   Va

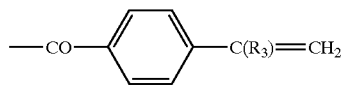   VIa

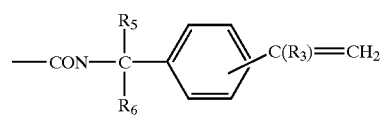   VIIa

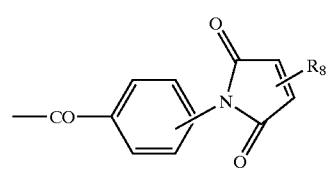   VIIIa

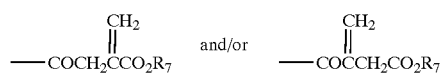   IXa wherein

R$_3$ is hydrogen or C$_1$-C$_6$ alkyl;

R$_4$ is hydrogen, C$_1$-C$_6$ alkyl; phenyl; phenyl substituted with one or more groups selected from C$_1$-C$_6$ alkyl, C$_1$-C$_6$ alkoxy, —N(C$_1$-C$_6$ alkyl)$_2$, nitro, cyano, C$_2$-C$_6$ alkoxycarbonyl, C$_2$-C$_6$ alkanoyloxy or halogen; 1- or 2-naphthyl; 1- or 2-naphthyl substituted with C$_1$-C$_6$ alkyl or C$_1$-C$_6$ alkoxy; 2- or 3-thienyl; 2- or 3-thienyl substituted with C$_1$-C$_6$ alkyl or halogen; 2- or 3-furyl; or 2- or 3-furyl substituted with C$_1$-C$_6$ alkyl;

R$_5$ and R$_6$ are independently selected from hydrogen, C$_1$-C$_6$ alkyl, substituted C$_1$-C$_6$ alkyl, aryl or may be combined to represent a —(—CH$_2$—)$_{3-5}$ radical;

R$_7$ is hydrogen, C$_1$-C$_6$ alkyl, substituted C$_1$-C$_6$ alkyl, C$_3$-C$_8$ alkenyl, C$_3$-C$_8$ cycloalkyl or aryl; and R$_8$ is selected from hydrogen, C$_1$-C$_6$ alkyl or aryl.

3. A photopolymerizable colorant according to claim 1 having the formula

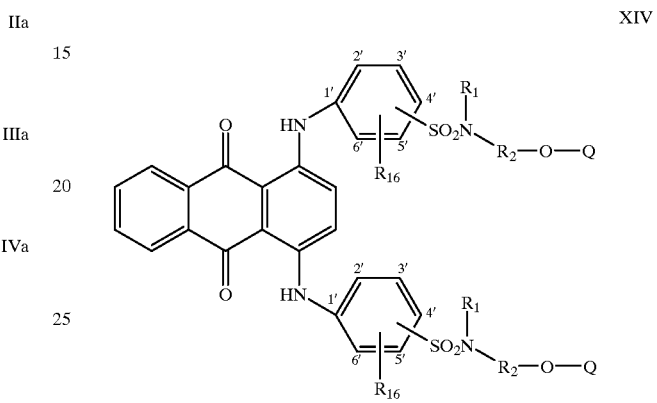   XIV wherein

R$_1$ is hydrogen or C$_1$-C$_6$ alkyl;

R$_2$ is C$_2$-C$_8$ alkylene, arylene, C$_3$-C$_8$ cycloalkylene, arylene-C$_1$-C$_6$ alkylene, arylene-oxy-C$_1$-C$_6$ alkylene, arylenethio-C$_1$-C$_6$ alkylene, 1,4-cyclohexylenedimethylene or —(—CH$_2$CH$_2$O)$_m$—CH$_2$CH$_2$—;

m is 1–3;

R$_{16}$ is selected from 2',6'-di-C$_1$-C$_6$ alkyl; and

Q is —COC(R$_3$)=CH$_2$ wherein R$_3$ is hydrogen or methyl.

4. A photopolymerizable colorant according to claim 4 having the formula:

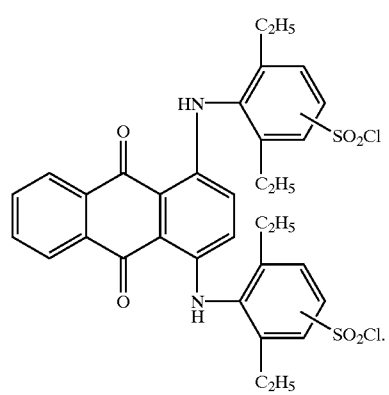

5. A photopolymerizable colorant according to claim 1 having the formula

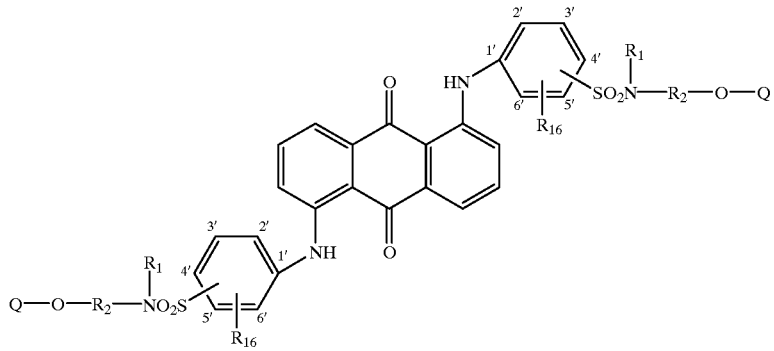

wherein $R_1$ is hydrogen or $C_1$–$C_6$ alkyl;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —(—CH$_2$CH$_2$O)$_m$—CH$_2$CH$_2$—;

m is 1–3;

$R_{16}$ is selected from 2',6'-di-$C_1$–$C_6$ alkyl; and

Q is —COC(R$_3$)=CH$_2$ wherein $R_3$ is hydrogen or methyl.

6. A photopolymerizable colorant according to claim 1 having the formula

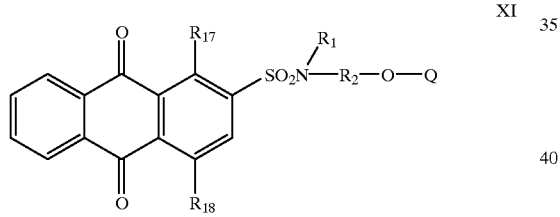

wherein $R_1$ is hydrogen, $C_1$–$C_6$ alkyl, substituted $C_1$–$C_6$ alkyl, $C_3$–$C_8$ cycloalkyl, aryl or —R$_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —(—CH$_2$CH$_2$O)$_m$—CH$_2$CH$_2$—;

m is 1–3;

$R_{17}$ is amino, $C_1$–$C_8$-alkylamino, substituted $C_1$–$C_8$-alkylamino as defined above, $C_3$–$C_8$-cycloalkylamino, $C_3$–$C_8$-alkenylamino, $C_3$–$C_8$-alkynylamino or arylamino;

$R_{18}$ is halogen, amino, $C_1$–$C_8$ alkylamino, substituted $C_1$–$C_8$-alkylamino, $C_3$–$C_8$-cycloalkylamino, $C_3$–$C_8$-alkenylamino, $C_3$–$C_8$-alkynylamino, arylamino, hydroxy, arylthio, heteroarylthio, $C_2$–$C_6$-alkanoylamino, aroylamino, $C_1$–$C_6$-alkylsulfonylamino, or arylsulfonylamino; and Q is an ethylenically-unsaturated, photopolymerizable group selected from the following organic radicals:

—COC(R$_3$)=CH—R$_4$    Ia

—CONHCOC(R$_3$)=CH—R$_4$    IIa

—CONH—$C_1$–$C_6$ alkylene OCOC(R$_3$)=CH—R$_4$    IIIa

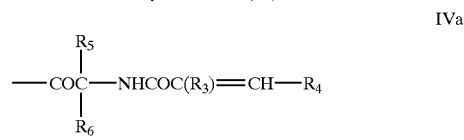 IVa

—COCH=CH—CO$_2$R$_7$    Va

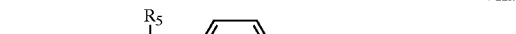 VIa

 VIIa

 VIIIa or

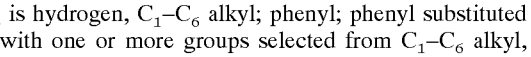 IXa wherein $R_3$ is hydrogen or $C_1$–$C_6$ alkyl;

$R_4$ is hydrogen, $C_1$–$C_6$ alkyl; phenyl; phenyl substituted with one or more groups selected from $C_1$–$C_6$ alkyl, $C_1$–$C_6$ alkoxy, —N($C_1$–$C_6$ alkyl)$_2$, nitro, cyano, $C_2$–$C_6$ alkoxycarbonyl, $C_2$–$C_6$ alkanoyloxy or halogen; 1- or 2-naphthyl; 1- or 2-naphthyl substituted with $C_1$–$C_6$ alkyl or $C_1$–$C_6$ alkoxy; 2- or 3-thienyl; 2- or 3-thienyl substituted with $C_1$–$C_6$ alkyl or halogen; 2- or 3-furyl; 2- or 3-furyl substituted with $C_1$–$C_6$ alkyl;

$R_5$ and $R_6$ are independently selected from hydrogen, $C_1$–$C_6$ alkyl, substituted $C_1$–$C_6$ alkyl, aryl or may be combined to represent a —(—CH$_2$—)$_{3-5}$ radical;

49

$R_7$ is hydrogen or a group selected from $C_1$–$C_6$ alkyl, substituted $C_1$–$C_6$ alkyl, $C_3$–$C_8$ alkenyl, $C_3$–$C_8$ cycloalkyl or aryl; and $R_8$ is hydrogen, $C_1$–$C_6$ alkyl or aryl.

7. A photopolymerizable colorant according to claim 7 wherein $R_1$ is hydrogen, $C_1$–$C_6$ alkyl, or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —(—$CH_2CH_2O$)$_m$—$CH_2CH_2$—;

m is 1–3;

$R_{17}$ is amino; $C_1$–$C_8$-alkylamino, substituted $C_1$–$C_8$-alkylamino as defined above, $C_3$–$C_8$-cycloalkylamino, $C_3$–$C_8$-alkenylamino, $C_3$–$C_8$-alkynylamino or arylamino;

$R_{18}$ is halogen, amino, $C_1$–$C_8$ alkylamino, substituted $C_1$–$C_8$-alkylamino, $C_3$–$C_8$-cycloalkylamino, $C_3$–$C_8$-alkenylamino, $C_3$–$C_8$-alkynylamino, arylamino, hydroxy, arylthio, heteroarylthio, $C_2$–$C_6$-alkanoylamino, aroylamino, $C_1$–$C_6$-alkylsulfonylamino, or arylsulfonylamino; and Q is —COC($R_3$)=$CH_2$ wherein $R_3$ is hydrogen or methyl.

8. A photopolymerizable colorant according to claim 1 having the formula

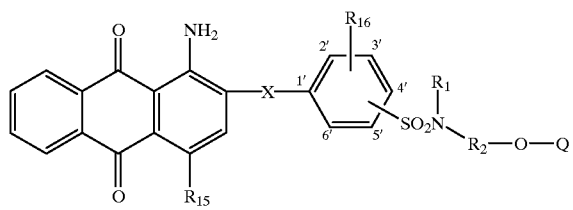

XVI wherein $R_1$ is hydrogen, $C_1$–$C_6$ alkyl, or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —(—$CH_2CH_2O$)$_m$—$CH_2CH_2$—;

m is 1–3;

$R_{15}$ is hydrogen, amino; $C_1$–$C_8$-alkylamino; $C_1$–$C_8$-alkylamino substituted with one or more groups selected from hydroxy, cyano, halogen, aryl, heteroaryl, $C_3$–$C_8$-cycloalkyl, furyl, $C_1$–$C_6$-alkoxy, $C_1$–$C_6$-alkylthio, arylthio, aryloxy or-$OCH_2CH_2O$($OCH_2CH_2$)$_{1-3}$OR', wherein R' is selected from hydrogen, $C_1$–$C_6$-alkyl or $C_2$–$C_6$-alkanoyloxy; $C_3$–$C_8$-cycloalkylamino; $C_3$–$C_8$-alkenylamino; $C_3$–$C_8$-alkynylamino; arylamino; furfurylamino; $C_1$–$C_6$-alkoxy; —$OCH_2CH_2$—($OCH_2CH_2$)$_{1-3}$OR', wherein R' is as previously defined; halogen; hydroxy; $C_1$–$C_6$-alkylthio; arylthio; heteroarylthio; thiocyano; tetrahydrofurfurylamino; —$CH_2$-cyclohexane-1,4-diyl-$CH_2$OR', wherein R' is as previously defined; or

50

$R_{16}$ is hydrogen or 1–2 groups selected from $C_1$–$C_6$-alkyl, $C_1$–$C_6$-alkoxy or halogen;

X is —O—, —S—, —$SO_2$—, or —O—$C_2$–$C_6$ alkylene; and

Q is —COC($R_3$)=$CH_2$ wherein $R_3$ is hydrogen or methyl.

9. A photopolymerizable colorant according to claim 1 having the formula

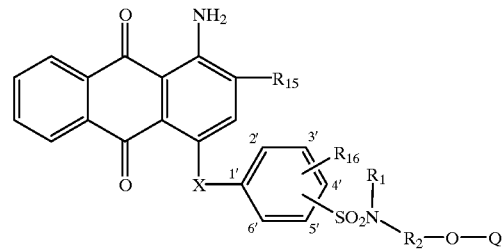

XVII wherein $R_1$ is hydrogen, $C_1$–$C_6$ alkyl, or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —(—$CH_2CH_2O$)$_m$—$CH_2CH_2$—;

m is 1–3;

$R_{15}$ is hydrogen, $C_1$–$C_6$-alkoxy; —$OCH_2CH_2$(O$CH_2CH_2$)$_{1-3}$OR', wherein R' is hydrogen, $C_1$–$C_6$-alkyl or $C_2$–$C_6$-alkanoyloxy; halogen; hydroxy; $C_1$–$C_6$-alkylthio; arylthio; aryl; aryloxy; arylsulfonyl; $C_2$–$C_6$-alkanoyl; aroyl; $C_2$–$C_6$-alkanoyloxy; $C_2$–$C_6$-alkoxycarbonyl; heteroaryl; heteroarylthio; cyano; nitro; trifluoromethyl; thiocyano; —$SO_2C_1$–$C_6$-alkyl; —$SO_2NH_2$; —$SO_2NHC_1$–$C_6$-alkyl; —$SO_2N(C_1$–$C_6$ alkyl)$_2$; —$SO_2N(C_1$–$C_6$ alkyl)aryl; —$SO_2NH$-aryl; —$CONH_2$; —$CONHC_1$–$C_6$-alkyl; —$CON(C_1$–$C_6$-alkyl)$_2$; —$CONH$-aryl; and —$CON(C_1$–$C_6$alkyl) aryl;

$R_{16}$ is hydrogen or 1–2 groups selected from $C_1$–$C_6$-alkyl, $C_1$–$C_6$-alkoxy or halogen;

X is —NH— or —S—; and

Q is —COC($R_3$)=$CH_2$ wherein $R_3$ is hydrogen or methyl.

10. A photopolymerizable colorant according to claim 1 having the formula

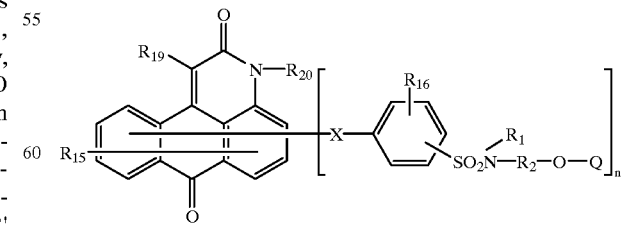

wherein $R_1$ is hydrogen, $C_1$–$C_6$ alkyl, substituted $C_1$–$C_6$ alkyl, $C_3$–$C_8$ cycloalkyl, aryl or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —($CH_2CH_2O)_m$—$CH_2CH_2$—;

m is 1–3;

n is 1–4;

$R_{15}$ is hydrogen or $R_{15}$ represents 1–4 groups selected from amino; $C_1$–$C_8$-alkylamino; $C_1$–$C_8$-alkylamino substituted with one or more groups selected from hydroxy, cyano, halogen, aryl, heteroaryl, $C_3$–$C_8$-cycloalkyl, furyl, $C_1$–$C_6$-alkoxy, $C_1$–$C_6$-alkylthio, arylthio, aryloxy or —$OCH_2CH_2O$ $(OCH_2CH_2)_{1-3}OR'$, wherein R' is selected from hydrogen, $C_1$–$C_6$-alkyl or $C_2$–$C_6$-alkanoyloxy; $C_3$–$C_8$-cycloalkylamino; $C_3$–$C_8$-alkenylamino; $C_3$–$C_8$-alkynylamino; arylamino; furfurylamino; $C_1$–$C_6$-alkoxy; —$OCH_2CH_2(OCH_2CH_2)_{1-3}OR'$, wherein R' is as previously defined; halogen; hydroxy; $C_1$–$C_6$-alkylthio; arylthio; aryl; aryloxy; arylsulfonyl; $C_2$–$C_6$-alkanoyl; aroyl; $C_2$–$C_6$-alkanoyloxy; $C_2$–$C_6$-alkoxycarbonyl; heteroaryl; heteroarylthio; cyano; nitro; trifluoromethyl; thiocyano; —$SO_2C_1$–$C_6$-alkyl; —$SO_2NH_2$; —$SO_2NHC_1$–$C_6$-alkyl; —$SO_2N(C_1$–$C_6$ alkyl)$_2$; —$SO_2N(C_1$–$C_6$ alkyl)aryl; —$SO_2NH$-aryl; —$CONH_2$; —$CONHC_1$–$C_6$-alkyl; —$CON(C_1$–$C_6$-alkyl)$_2$; —$CONH$-aryl; —$CON(C_1$–$C_6$alkyl)aryl; $C_1$–$C_6$ alkyl; tetrahydrofurfurylamino; —$CH_2$-cyclohexane-1,4-diyl-$CH_2OR'$, wherein R' is as previously defined; or

$R_{16}$ is hydrogen or 1–2 groups selected from $C_1$–$C_6$-alkyl, $C_1$–$C_6$-alkoxy or halogen;

$R_{19}$ is hydrogen, cyano, $C_1$–$C_6$-alkoxy, $C_1$–$C_6$-alkylthio, aryl, arylamino, aryloxy, arylthio, heteroaryl, heteroarylthio, halogen, $C_2$–$C_6$-alkoxycarbonyl, aroyl, $C_1$–$C_6$-alkylsulfonyl, arylsulfonyl or $C_1$–$C_6$-alkylamino;

$R_{20}$ is hydrogen, $C_1$–$C_8$-alkyl, substituted $C_1$–$C_8$-alkyl as defined above, aryl or $C_3$–$C_8$-cyloalkyl;

X is —NH—, —O—, —S—, —$SO_2$—, or —O—$C_2$–$C_6$ alkylene; and

Q is an ethylenically-unsaturated, photopolymerizable group selected from the following organic radicals:

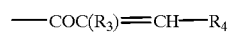 Ia

 IIa

 IIIa

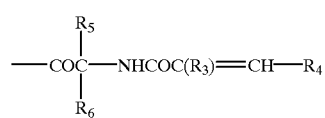 IVa

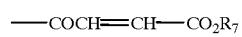 Va

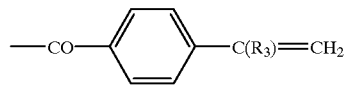 VIa

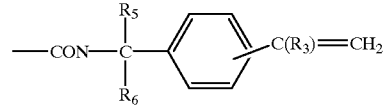 VIIa

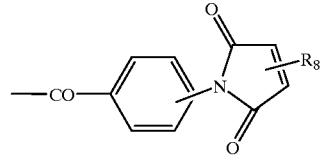 VIIIa

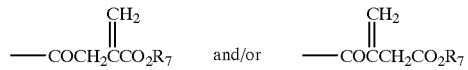  IXa wherein $R_3$ is hydrogen or $C_1$–$C_6$ alkyl;

$R_4$ is hydrogen, $C_1$–$C_6$ alkyl; phenyl; phenyl substituted with one or more groups selected from $C_1$–$C_6$ alkyl, $C_1$–$C_6$ alkoxy, —$N(C_1$–$C_6$ alkyl)$_2$, nitro, cyano, $C_2$–$C_6$ alkoxycarbonyl, $C_2$–$C_6$ alkanoyloxy or halogen; 1- or 2-naphthyl; 1- or 2-naphthyl substituted with $C_1$–$C_6$ alkyl or $C_1$–$C_6$ alkoxy; 2- or 3-thienyl; 2- or 3-thienyl substituted with $C_1$–$C_6$ alkyl or halogen; 2- or 3-furyl; 2- or 3-furyl substituted with $C_1$–$C_6$ alkyl;

$R_5$ and $R_6$ are independently selected from hydrogen, $C_1$–$C_6$ alkyl, substituted $C_1$–$C_6$ alkyl, aryl or may be combined to represent a —($CH_2$—)$_{3-5}$ radical;

$R_7$ is hydrogen or $C_1$–$C_6$ alkyl, substituted $C_1$–$C_6$ alkyl, $C_3$–$C_8$ alkenyl, $C_3$–$C_8$ cycloalkyl or aryl; and $R_8$ is hydrogen, $C_1$–$C_6$ alkyl or aryl.

11. A photopolymerizable colorant according to claim 1 having the formula

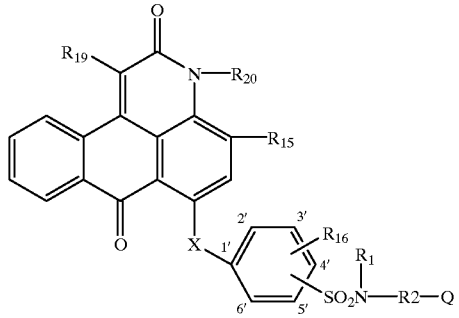 XVIII wherein $R_1$ is hydrogen, $C_1$–$C_6$ alkyl, or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —($CH_2CH_2O)_m$—$CH_2CH_2$—;

m is 1–3;

$R_{15}$ is hydrogen, $C_1$–$C_6$-alkyl, $C_1$–$C_6$-alkoxy, or halogen;

$R_{16}$ is hydrogen, $C_1$–$C_6$-alkyl, $C_1$–$C_6$-alkoxy or halogen;

$R_{19}$ is hydrogen, cyano, $C_1$–$C_6$-alkoxy, $C_1$–$C_6$-alkylthio, aryl, arylamino, aryloxy, arylthio, heteroaryl, heteroarylthio, halogen, $C_2$–$C_6$-alkoxycarbonyl, aroyl, $C_1$–$C_6$-alkylsulfonyl, arylsulfonyl or $C_1$–$C_6$-alkylamino;

$R_{20}$ is $C_1$–$C_8$-alkyl or substituted $C_1$–$C_8$-alkyl as defined above;

X is —NH— or —S—; and

Q is —COC($R_3$)=$CH_2$ wherein $R_3$ is hydrogen or methyl.

12. A photopolymerizable colorant according to claim 1 having the formula

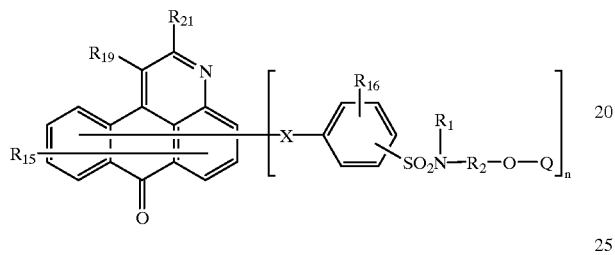

XIII wherein
$R_1$ is hydrogen, $C_1$–$C_6$ alkyl, substituted $C_1$–$C_6$ alkyl, $C_3$–$C_8$ cycloalkyl, aryl or —$R_2$—OQ;

$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —($CH_2CH_2O$)$_m$—$CH_2CH_2$—;

m is 1–3;

n is 1–4;

$R_{15}$ is hydrogen or $R_{15}$ represents 1–4 groups selected from amino; $C_1$–$C_8$-alkylamino; $C_1$–$C_8$-alkylamino substituted with one or more groups selected from hydroxy, cyano, halogen, aryl, heteroaryl, $C_3$–$C_8$-cycloalkyl, furyl, $C_1$–$C_6$-alkoxy, $C_1$–$C_6$-alkylthio, arylthio, aryloxy or —$OCH_2CH_2O(OCH_2CH_2)_{1-3}OR'$, wherein R' is selected from hydrogen, $C_1$–$C_6$-alkyl or $C_2$–$C_6$-alkanoyloxy; $C_3$–$C_8$-cycloalkylamino; $C_3$–$C_8$-alkenylamino; $C_3$–$C_8$-alkynylamino; arylamino; furfurylamino; $C_1$–$C_6$-alkoxy; —$OCH_2CH_2(OCH_2CH_2)_{1-3}OR'$, wherein R' is as previously defined; halogen; hydroxy; $C_1$–$C_6$-alkylthio; arylthio; aryl; aryloxy; arylsulfonyl; $C_2$–$C_6$-alkanoyl; aroyl; $C_2$–$C_6$-alkanoyloxy; $C_2$–$C_6$-alkoxycarbonyl; heteroaryl; heteroarylthio; cyano; nitro; trifluoromethyl; thiocyano; —$SO_2C_1$–$C_6$-alkyl; —$SO_2NH_2$; —$SO_2NHC_1$–$C_6$-alkyl; —$SO_2N(C_1$–$C_6$ alkyl)$_2$; —$SO_2N(C_1$–$C_6$ alkyl)aryl; —$SO_2NH$-aryl; —$CONH_2$; —$CONHC_1$–$C_6$-alkyl; —$CON(C_1$–$C_6$-alkyl)$_2$; —CONH-aryl; —CON($C_1$–$C_6$alkyl) aryl; $C_1$–$C_6$ alkyl; tetrahydrofurfurylamino; or —$CH_2$-cyclohexane-1,4-diyl-$CH_2OR'$, wherein R' is as previously defined;

$R_{16}$ is hydrogen or 1–2 groups selected from $C_1$–$C_6$-alkyl, $C_1$–$C_6$-alkoxy or halogen;

$R_{19}$ is hydrogen, cyano, $C_1$–$C_6$-alkoxy, $C_1$–$C_6$-alkylthio, aryl, arylamino, aryloxy, arylthio, heteroaryl, heteroarylthio, halogen, $C_2$–$C_6$-alkoxycarbonyl, aroyl, $C_1$–$C_6$-alkylsulfonyl, arylsulfonyl or $C_1$–$C_6$-alkylamino;

$R_{21}$ is hydrogen, $C_1$–$C_6$-alkyl, aryl or —N($R_{22}$)$R_{23}$, wherein $R_{22}$ and $R_{23}$ independently are selected from hydrogen, $C_3$–$C_8$-cycloalkyl, $C_1$–$C_6$-alkyl or $C_1$–$C_6$-alkyl substituted with $C_1$–$C_6$-alkoxy, hydroxy, halogen, $C_2$–$C_6$-alkanoyloxy, aryl and $C_3$–$C_8$-cycloalkyl; or $R_{22}$ and $R_{23}$ in combination represent a divalent radical having the formulas (—$CH_2$—)$_{4-6}$ or —$CH_2CH_2$—L—$CH_2CH_2$—, wherein L is a divalent linking group selected from —O—, —S—, —$SO_2$— or —N($R_{24}$), wherein $R_{24}$ is selected from hydrogen, $C_1$–$C_6$-alkyl, aryl, aroyl, $C_2$–$C_6$-akanoyl, $C_1$–$C_6$-alkylsulfonyl or arylsulfonyl;

X is —NH—, —O—, —S—, —$SO_2$—, or —O—$C_2$–$C_6$ alkylene; and

Q is an ethylenically-unsaturated, photopolymerizable group selected from the following organic radicals:

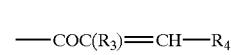 Ia

 IIa

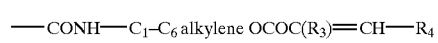 IIIa

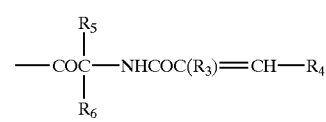 IVa

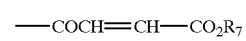 Va

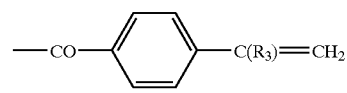 VIa

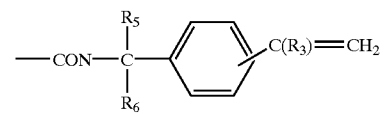 VIIa

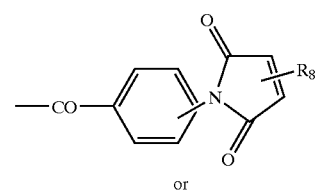 VIIIa or

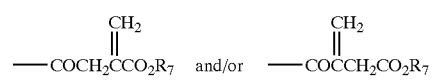 IXa wherein
$R_3$ is hydrogen or $C_1$–$C_6$ alkyl;

$R_4$ is hydrogen, $C_1$–$C_6$ alkyl; phenyl; phenyl substituted with one or more groups selected from $C_1$–$C_6$ alkyl, $C_1$–$C_6$ alkoxy, —N($C_1$–$C_6$ alkyl)$_2$, nitro, cyano, $C_2$–$C_6$ alkoxycarbonyl, $C_2$–$C_6$ alkanoyloxy or halogen; 1- or 2-naphthyl; 1- or 2-naphthyl substituted with $C_1$–$C_6$ alkyl or $C_1$–$C_6$ alkoxy; 2- or 3-thienyl; 2- or 3-thienyl substituted with $C_1$–$C_6$ alkyl or halogen; or 2- or 3-furyl; 2- or 3-furyl substituted with $C_1$–$C_6$ alkyl;

$R_5$ and $R_6$ are independently selected from hydrogen, $C_1$–$C_6$ alkyl, substituted $C_1$–$C_6$ alkyl, aryl or may be combined to represent a —(—$CH_2$—)$_{3-5}$ radical;

$R_7$ is hydrogen, $C_1$–$C_6$ alkyl, substituted $C_1$–$C_6$ alkyl, $C_3$–$C_8$ alkenyl, $C_3$–$C_8$ cycloalkyl or aryl; and $R_8$ is hydrogen, $C_1$–$C_6$ alkyl or aryl.

13. A photopolymerizable colorant according to claim 1 having the formula

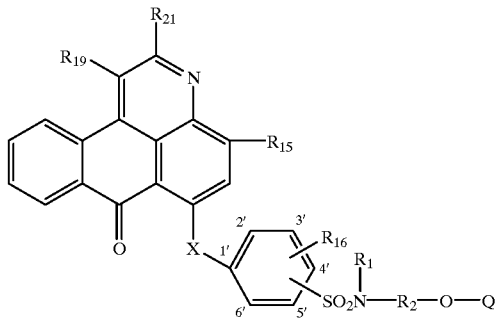

XIX wherein
$R_1$ is hydrogen, $C_1$–$C_6$ alkyl, or —$R_2$—OQ;
$R_2$ is $C_2$–$C_8$ alkylene, arylene, $C_3$–$C_8$ cycloalkylene, arylene-$C_1$–$C_6$ alkylene, arylene-oxy-$C_1$–$C_6$ alkylene, arylenethio-$C_1$–$C_6$ alkylene, 1,4-cyclohexylenedimethylene or —(—$CH_2CH_2O$)$_m$—$CH_2CH_2$—;
m is 1–3;
$R_{15}$ is hydrogen, $C_1$–$C_6$-alkyl or halogen;
$R_{16}$ is hydrogen or 1–2 groups selected from $C_1$–$C_6$-alkyl, $C_1$–$C_6$-alkoxy or halogen;
$R_{19}$ is hydrogen or cyano;
$R_{21}$ is —N($R_{22}$)$R_{23}$, wherein $R_{22}$ and $R_{23}$ are independently selected from $C_1$–$C_6$-alkyl or $R_{22}$ and $R_{23}$ in combination are a divalent radical having the formulas (—$CH_2$—)$_{4-6}$ or —$CH_2CH_2$—L—$CH_2CH_2$—, wherein L is a divalent linking group selected from —O—, —S—, —$SO_2$— or —N($R_{24}$), wherein $R_{24}$ is selected from hydrogen, $C_1$–$C_6$-alkyl, aryl, aroyl, $C_2$–$C_6$-akanoyl, $C_1$–$C_6$-alkylsulfonyl or arylsulfonyl;
X is —NH— or —S—; and
Q is —COC($R_3$)=$CH_2$ wherein $R_3$ is hydrogen or methyl.

14. A coating composition comprising (i) one or more polymerizable vinyl compounds, (ii) one or more of the colorant compounds of claim 1, and (iii) a photoinitiator.

15. A coating composition according to claim 15 comprising (i) one or more polymerizable vinyl compounds, (ii) one or more of the colorant compounds of claim 2 present in a concentration of about 0.05 to 15 weight percent based on the weight of component (i), and (iii) a photoinitiator present in a concentration of about 1 to 15 weight percent based on the weight of the polymerizable vinyl compound(s) present in the coating composition.

16. A coating composition according to claim 16 wherein the polymerizable vinyl compounds comprise a solution of a polymeric, polymerizable vinyl compound selected from acrylated or methacrylated polyesters, acrylated or methacrylated polyethers, acrylated or methacrylated epoxy polymers, acrylated or methacrylated urethanes, or mixtures thereof, in a diluent selected from monomeric acrylate or methacrylate esters.

17. A polymeric coating composition comprising a polymer of one or more acrylic acid esters, one or more methacrylic acid esters and/or other copolymerizable vinyl compounds, having copolymerized therein one or more of the colorant compounds defined in claim 1.

18. A polymeric coating composition according to claim 17 comprising an acrylic polymer of one or more acrylic acid esters, one or more methacrylic acid esters or a mixture thereof having copolymerized therein one or more of the colorant compounds defined in claim 2.

19. A polymeric coating composition according to claim 17 containing from about 0.05 to 15.0 weight percent of the residue of one or more of the dye compounds of claim 2 based on the weight of the coating composition.

20. A polymeric coating composition according to claim 17 wherein the polymer comprises an unsaturated polyester containing one or more maleate/fumarate residues; one or more monomers which contain one or more vinyl ether groups, one or more vinyl ester groups, or combination thereof, and, optionally, one or more acrylic or methacrylic acid esters; or a mixture thereof.

21. A photopolymerizable colorant having the formula:

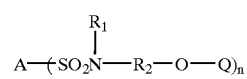

I wherein
A is a residue of phthalocyanine or metal pthalocyanine;
$R_1$ is hydrogen, $C_1$$C_6$ alkyl, substituted $C_1$-$C_6$ alkyl, $C_3$-$C_8$ cycloalkyl, aryl or —$R_2$-OQ;
$R_2$ is $C_2$-$C_8$ alkylene, arylene, $C_3$-$C_8$ cycloalkylene, arylene —$C_1$-$C_6$ alkylene, arylene—oxy—$C_1$-$C_6$ alkylene, arylenethio —$C_1$-$C_6$ alkylene, 1,4-cyclohexylenedimethylene or —(—$CH_2CH_2O$)$_m$—$CH_2CH_2$—;
m is 1–3;
n is 1–4;
Q is —COC($R_3$)=CH-$R_4$;
$R_2$ is $C_1$-$C_6$ alkyl; and
$R_4$ is hydrogen, $C_1$-$C_6$ alkyl; phenyl substituted with one or more groups selected from $C_1$-$C_6$ alkyl, $C_1$-$C_6$ alkoxy, —N($C_1$-$C_6$ alkyl)$_2$, nitro, cyano, $C_2$-$C_6$ alkoxycarbonyl, $C_2$-$C_6$ alkanoyloxy or halogen; 1- or 2-naphthyl; 1- or 2-naphthyl substituted with $C_1$-$C_6$ alkyl or $C_1$-$C_6$ alkoxy; 2- or 3-thienyl substituted with $C_1$-$C_6$ alkyl or halogen; 2- or 3- furyl; or 2- or 3-furyl substituted with $C_1$-$C_6$ alkyl.

22. A coating composition (i) one or more polymerizable vinyl compounds, (ii) one or more of the colorant compounds of claim 21, and (iii) a photoinitiator.

23. A coating composition according to claim 22 wherein the colorant is present in a concentration of about 0.05 to 15 weight percent based on the weight of component (i) and the photoinitiator is present in a concentration of about 1 to 15 weight percent based on the weight of the polymerizable vinyl compound(s) present in the coating composition.

24. A polymeric coating composition comprising a polymer of one or more acrylic acid esters, one or more methacrylic acid esters and/or other copolymerizable vinyl compounds, having copolymerized therein one or more of the colorant compounds defined in claim 21.

25. A photopolymerizable colorant compound having the formula

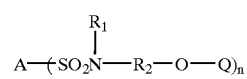

I wherein
A is a residue of phthalocyanine or metal phthalocyanine;

$R_1$ is hydrogen, $C_1$-$C_6$ alkyl, substituted $C_1$-$C_6$ alkyl, $C_3$-$C_8$ cycloalkyl, aryl or —$R_2$-OQ;

$R_2$ is $C_2$-$C_8$ alkylene, arylene, $C_3$-$C_8$ cycloalkylene, arylene —$C_1$-$C_6$ alkylene, arylene-oxy-$C_1$-$C_6$ alkylene, arylenethio —$C_1$-$C_6$ alyklene, 1,4-cyclohexylenedimethylene or —(—$CH_2CH_2O$)$_m$—$CH_2CH_2$—;

m is 1–3;

n is 1–4;

Q is an ethylenically-unsaturated, photopolymerizable group selected from the following organic radicals;

 IIa

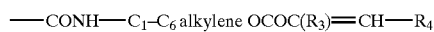 IIIa

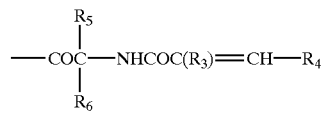 IVa

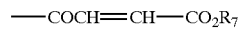 Va

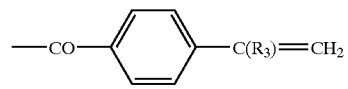 VIa

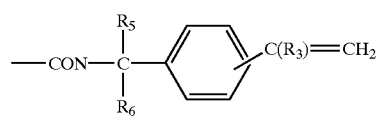 VIIa

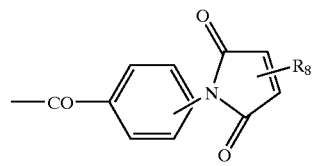 VIIIa

-continued
or

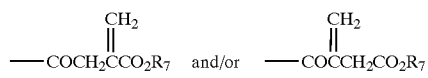 IXa wherein $R_3$ is hydrogen or $C_1$-$C_6$ alkyl;

$R_4$ is hydrogen, $C_1$-$C_6$ alkyl; phenyl; phenyl substituted with one or more groups selected from $C_1$-$C_6$ alkyl, $C_1$-$C_6$ alkoxy, —N($C_1$-$C_6$ alkyl)$_2$, nitro, cyano, $C_2$-$C_6$ alkoxycarbonyl, $C_2$-$C_6$ alkanoyloxy or halogen; 1- or 2-naphthyl; 1- or 2-naphthyl substituted with $C_1$-$C_6$ alkyl or $C_1$-$C_6$ alkoxy; 2- or 3-thienyl; 2- or 3-thienyl substituted with $C_1$-$C_6$ alkyl or halogen; 2- or 3- furyl; or 2- or 3-furyl substituted with $C_1$-$C_6$ alkyl;

$R_5$ and $R_6$ are independently selected from hydrogen, $C_1$-$C_6$ alkyl, substituted $C_1$-$C_6$ alkyl, aryl or may be combined to represent a —(—$CH_2$—)—$_{3-5}$ radical;

$R_7$ is hydrogen, $C_1$-$C_6$ alkyl, substituted $C_1$-$C_6$ alkyl, $C_3$-$C_8$ alkenyl, $C_3$-$C_8$ cycloalkyl or aryl; and $R_8$ is hydrogen, $C_1$-$C_6$ alkyl or aryl.

26. A coating composition comprising (i) one or more polymerizable vinyl compounds, (ii) one or more of the colorant compounds of claim 25, and (iii) a photoinitiator.

27. A coating composition according to claim 26 wherein the colorant is present in a concentration of about 0.05 to 15 weight percent based on the weight of component (i) and the photoinitiator is present in a concentration of about 1 to 15 weight percent based on the weight of the polymerizable vinyl compound(s) present in the coating composition.

28. A polymeric coating composition comprising a polymer of one or more acrylic acid esters, one or more methacrylic acid esters and/or other copolymerizable vinyl compounds, having copolymerized therein one or more of the colorant compounds defined in claim 25.

* * * * *